United States Patent
Lisy et al.

(10) Patent No.: US 10,258,916 B2
(45) Date of Patent: Apr. 16, 2019

(54) FILTERING SYSTEM INCLUDING IMPERMEABLE EXTENSION FOR FILTERING ELEMENT

(71) Applicant: Clark-Reliance Corporation, Strongsville, OH (US)

(72) Inventors: Thomas W. Lisy, Bay Village, OH (US); John A. Hobing, Louisville, KY (US)

(73) Assignee: Clark-Reliance Corporation, Strongsville, OH (US)

( * ) Notice: Subject to any disclaimer, the term of this patent is extended or adjusted under 35 U.S.C. 154(b) by 153 days.

(21) Appl. No.: 15/436,321

(22) Filed: Feb. 17, 2017

(65) Prior Publication Data

US 2017/0232376 A1    Aug. 17, 2017

Related U.S. Application Data

(60) Provisional application No. 62/296,238, filed on Feb. 17, 2016, provisional application No. 62/432,473, filed on Dec. 9, 2016.

(51) Int. Cl.
*B01D 46/00* (2006.01)
*B01D 46/24* (2006.01)
*B01D 46/42* (2006.01)

(52) U.S. Cl.
CPC ..... *B01D 46/2414* (2013.01); *B01D 46/0004* (2013.01); *B01D 46/0005* (2013.01); *B01D 46/4227* (2013.01); *B01D 2265/029* (2013.01)

(58) Field of Classification Search
CPC ............ B01D 46/00; B01D 46/0004; B01D 46/0005; B01D 46/2414; B01D 46/4227; B01D 2265/029

USPC ........................................................... 55/501
See application file for complete search history.

(56) References Cited

U.S. PATENT DOCUMENTS

| | | | |
|---|---|---|---|
| 3,386,230 A | 6/1968 | Riesberg et al. | |
| 3,527,027 A | 9/1970 | Knight et al. | |
| 3,802,160 A * | 4/1974 | Foltz ............... | B01D 46/24 55/487 |
| 4,108,775 A | 8/1978 | Wilkes et al. | |
| 4,189,310 A | 2/1980 | Hotta | |
| 4,516,994 A | 5/1985 | Kocher | |
| 4,561,979 A | 12/1985 | Harms et al. | |
| 4,892,667 A | 1/1990 | Parker, III et al. | |
| 5,417,848 A | 5/1995 | Erdmannsdorfer et al. | |
| 5,750,024 A | 5/1998 | Spearman | |
| 5,800,584 A | 9/1998 | Hinderer et al. | |
| 5,919,284 A | 7/1999 | Perry, Jr. et al. | |
| 6,168,647 B1 | 1/2001 | Perry, Jr. et al. | |
| 6,585,790 B2 | 7/2003 | Linnersten et al. | |
| 6,673,135 B2 | 1/2004 | West | |
| 6,858,067 B2 | 2/2005 | Bums et al. | |
| 7,235,177 B2 | 6/2007 | Herman et al. | |

(Continued)

OTHER PUBLICATIONS

International Search Report for International App. No. PCT/US2017/018454 dated May 4, 2017 (3 pages).

(Continued)

*Primary Examiner* — T. Bennett McKenzie
(74) *Attorney, Agent, or Firm* — Calfee, Halter & Griswold LLP

(57) ABSTRACT

The present invention provides a filtering system including an impermeable extension for a filtering element.

19 Claims, 27 Drawing Sheets

(56) References Cited

U.S. PATENT DOCUMENTS

| | | |
|---|---|---|
| 7,531,018 B2 | 5/2009 | Becker et al. |
| 7,998,251 B2 | 8/2011 | Pondelick et al. |
| 2003/0066407 A1* | 4/2003 | Shimooka .............. G10D 3/146 84/313 |
| 2006/0236867 A1 | 10/2006 | Neary |
| 2007/0175191 A1 | 8/2007 | Ziebold et al. |
| 2007/0209341 A1* | 9/2007 | Pearson ............. B01D 46/0031 55/418 |
| 2008/0314248 A1 | 12/2008 | Peteln |
| 2014/0157738 A1 | 6/2014 | Eberle |
| 2014/0208702 A1 | 7/2014 | Lundgren et al. |
| 2014/0373714 A1 | 12/2014 | Cloud et al. |

OTHER PUBLICATIONS

Written Opinion of the International Searching Authority for International App. No. PCT/US2017/018454 dated May 4, 2017 (5 pages).

\* cited by examiner

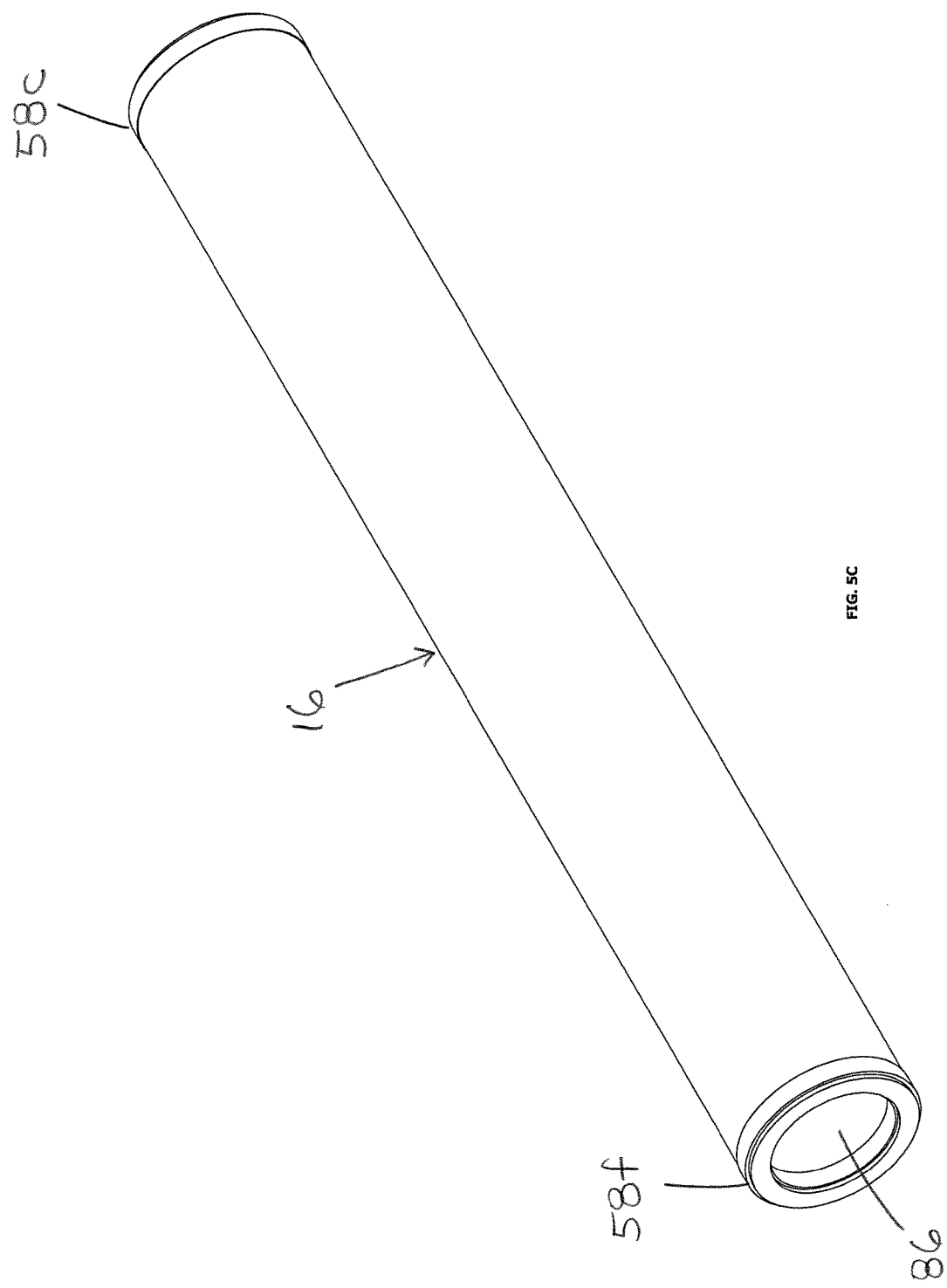

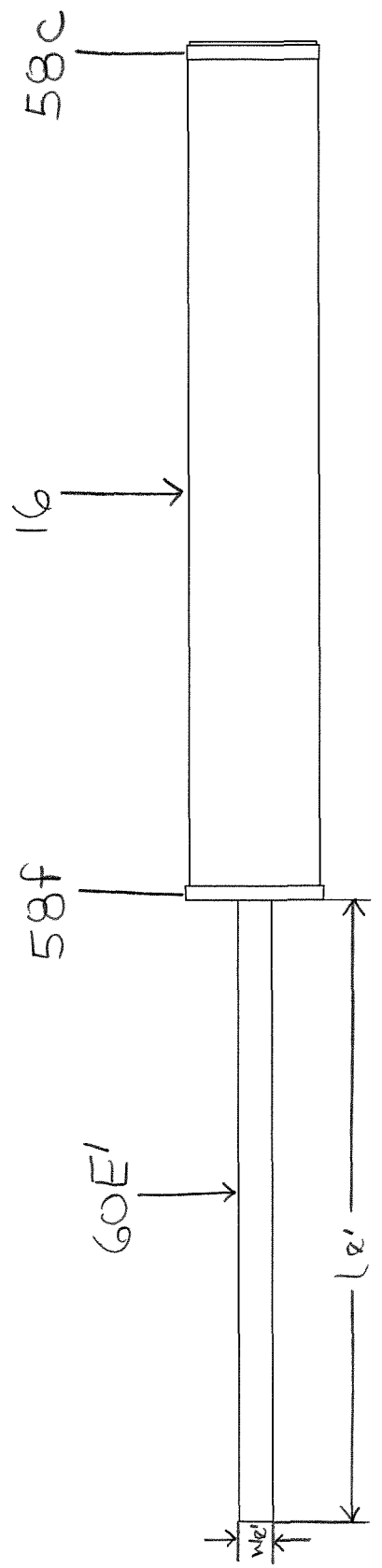

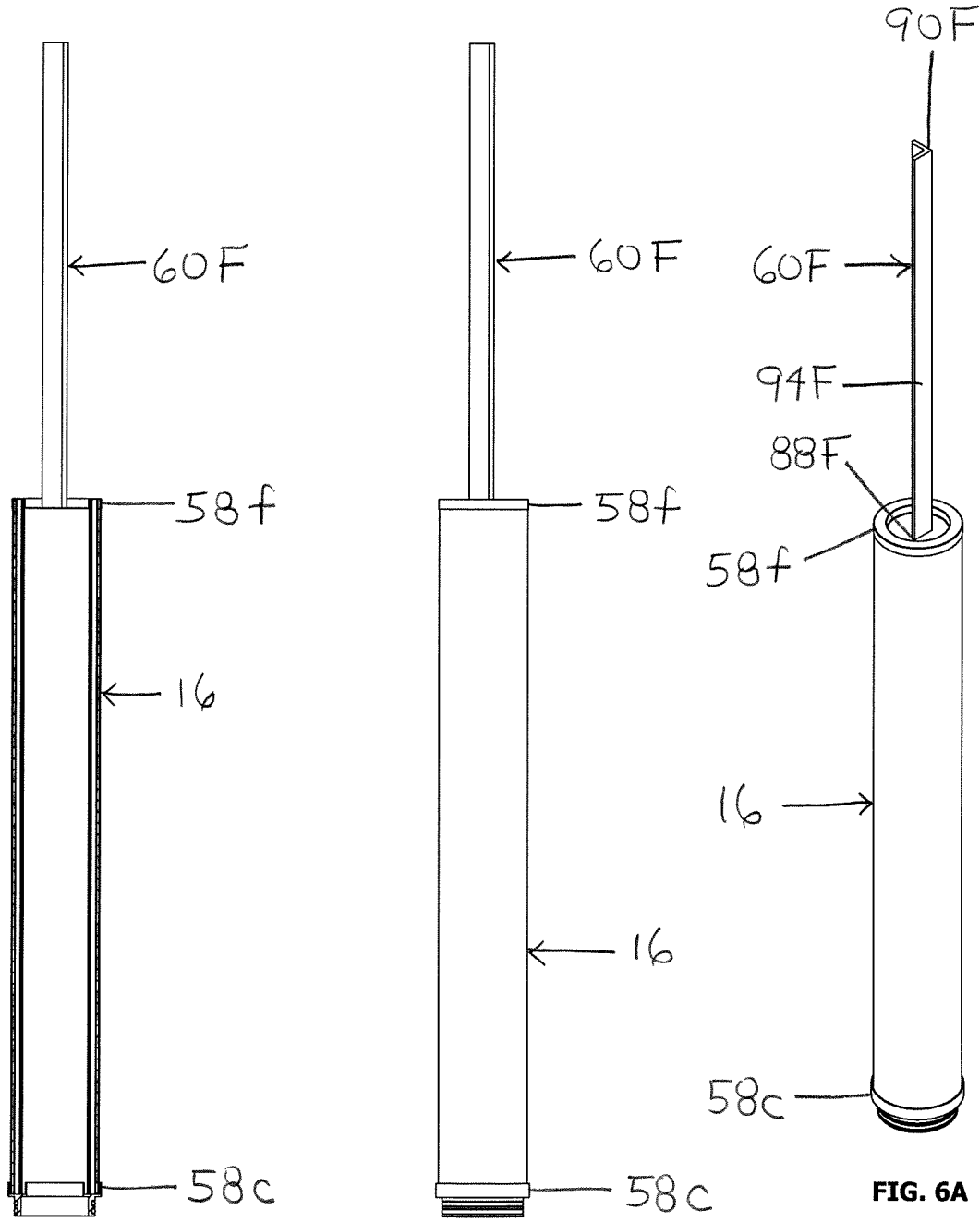

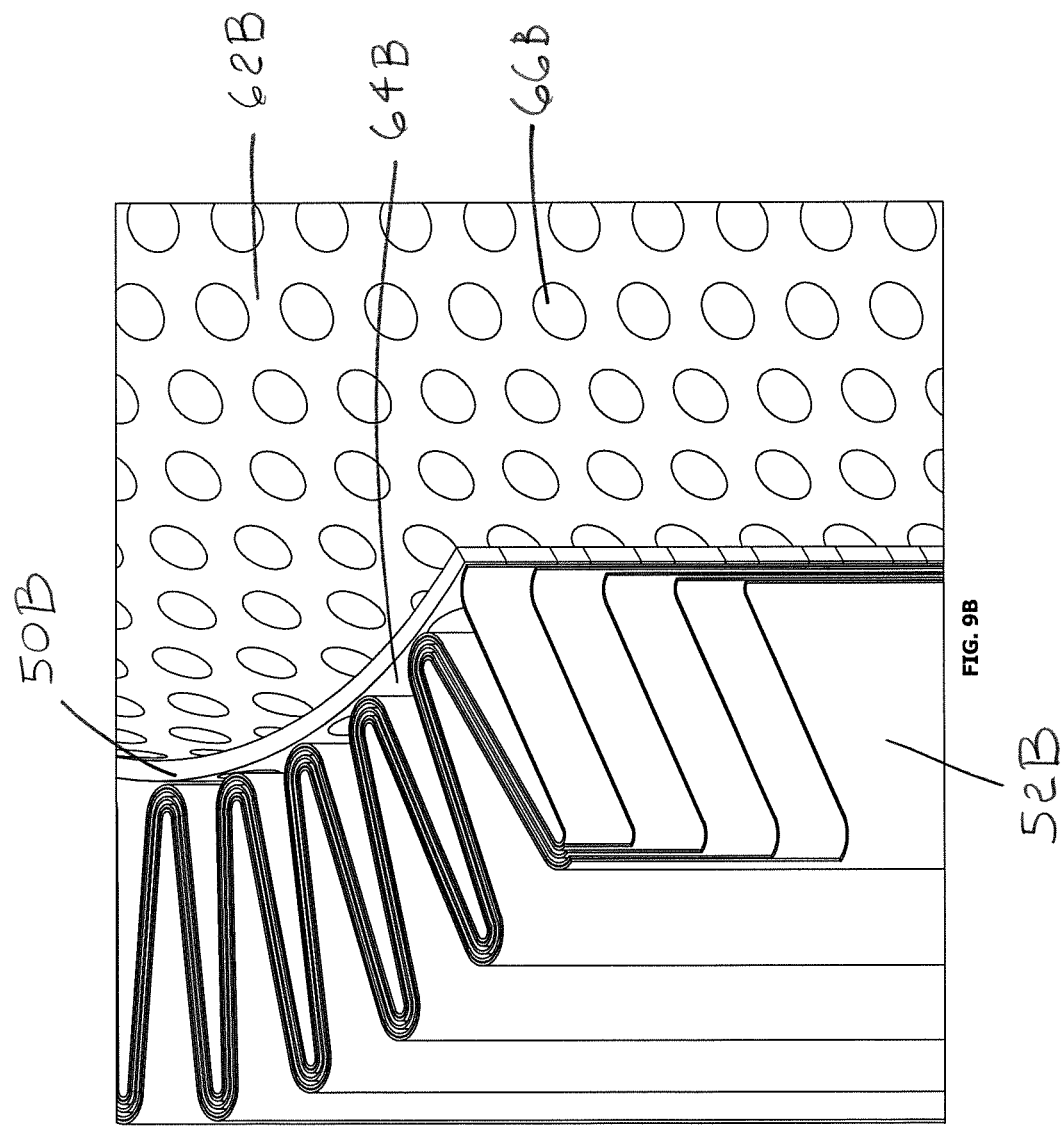

FILTERING SYSTEM INCLUDING IMPERMEABLE EXTENSION FOR FILTERING ELEMENT

CROSS-REFERENCE TO RELATED APPLICATIONS

This application claims the benefit of U.S. Provisional Application No. 62/296,238, filed Feb. 17, 2016, and U.S. Provisional Application No. 62/432,473, filed Dec. 9, 2016, the entire disclosures of which are hereby incorporated by reference.

FIELD

The present invention relates generally to a filtering system and, more particularly, to a filtering system including an impermeable extension for a filtering element.

BACKGROUND

Filtering systems for removing aerosols and particulates from gas streams are known. Known filtering systems include a vessel in which filtering elements are installed. In some filtering systems, the filtering elements need to be maintained and replaced through a top or an end of the vessel. Depending on how far from the top or the end of the vessel the filtering elements are installed, difficulties can arise in maintaining and replacing the filtering elements through the top or the end of the vessel. In some cases, the person maintaining or replacing the filtering elements needs to enter the vessel in order to maintain or replace the filtering elements.

SUMMARY

The present invention provides a filtering system including an impermeable extension for a filtering element.

In an exemplary embodiment, the filtering element includes a core, a filtering medium, a cap, and an extension. The core is operable to extend in a vessel. The core is hollow. The core has an interior and an exterior. The core is rigid. The core includes a connected end and a free end. The core has a length and a width. The filtering medium is operable to extend around the core. The filtering medium is permeable. The filtering medium includes a connected end and a free end. The filtering medium has a length and a width. The cap is operable to connect to the free end of the core and the free end of the filtering medium. The extension is operable to connect to the cap. The extension is rigid. The extension is impermeable. The extension includes a connected end and a free end. The extension has a length and a width. The extension is not operable to connect to any portion of the vessel. During installation, the filtering element is operable to be inserted into and secured in the vessel using the extension. During use, the pressurized gas enters the vessel through an inlet, passes through the filtering element, and exits the vessel through an outlet. During maintenance or replacement, the filtering element is operable to be removed from the vessel using the extension.

In an exemplary embodiment, the filtering system includes a vessel and a filtering element. The vessel is operable to hold a pressurized gas. The vessel is hollow. The vessel is rigid. The vessel includes a closed end and an open end. The vessel includes a cover operable to close the open end. The vessel includes an inlet, an outlet, and a drain. The filtering element is operable to extend in the vessel. The filtering element includes a core, a filtering medium, a cap, and an extension. The core is operable to extend in the vessel. The core is hollow. The core has an interior and an exterior. The core is rigid. The core includes a connected end and a free end. The core has a length and a width. The filtering medium is operable to extend around the core. The filtering medium is permeable. The filtering medium includes a connected end and a free end. The filtering medium has a length and a width. The cap is operable to connect to the free end of the core and the free end of the filtering medium. The extension is operable to connect to the cap. The extension is rigid. The extension is impermeable. The extension includes a connected end and a free end. The extension has a length and a width. The extension is not operable to connect to any portion of the vessel. During installation, the filtering element is operable to be inserted into and secured in the vessel using the extension. During use, the pressurized gas enters the vessel through an inlet, passes through the filtering element, and exits the vessel through an outlet. During maintenance or replacement, the filtering element is operable to be removed from the vessel using the extension.

In an exemplary embodiment, the filtering system includes a vessel and a filtering element. The vessel is operable to hold a pressurized gas. The vessel is hollow. The vessel is rigid. The vessel includes a closed end and an open end. The vessel includes a cover operable to close the open end. The vessel includes an inlet, an outlet, and a drain. The vessel includes a riser. The riser is operable to extend in the vessel and to fluidly connect to the inlet. The riser is hollow. The riser is rigid. The riser includes a vessel end and a filter end. The filtering element is operable to extend in the vessel. The filtering element includes a core, a filtering medium, a cap, and an extension. The core is operable to extend in the vessel. The core is hollow. The core has an interior and an exterior. The core is rigid. The core includes a connected end and a free end. The core has a length and a width. The filtering medium is operable to extend around the core. The filtering medium is permeable. The filtering medium includes a connected end and a free end. The filtering medium has a length and a width. The cap is operable to connect to the free end of the core and the free end of the filtering medium. The extension is operable to connect to the cap. The extension is rigid. The extension is impermeable. The extension includes a connected end and a free end. The extension has a length and a width. The extension is not operable to connect to any portion of the vessel. During installation, the filtering element is operable to be inserted into and secured in the vessel using the extension. During use, the pressurized gas enters the vessel through an inlet, passes through the filtering element, and exits the vessel through an outlet. During maintenance or replacement, the filtering element is operable to be removed from the vessel using the extension.

BRIEF DESCRIPTION OF THE DRAWINGS

—FIG. 1A is a cross-sectional front view of the system without a cover, FIG. 1B is a cross-sectional perspective view of the system without the cover, FIG. 1C is a cross-sectional front view of the system with the cover and with other components removed, FIG. 1D is a cross-sectional perspective view of the system with the cover and with other components removed, FIG. 1E is a detailed cross-sectional front view of components, and FIG. 1F is a further detailed cross-sectional front view of components;

—FIG. 2A is a cross-sectional front view of the system without a cover, FIG. 2B is a cross-sectional perspective view of the system without the cover, FIG. 2C is a cross-sectional front view of the system with the cover and with other components removed, FIG. 2D is a cross-sectional perspective view of the system with the cover and with other components removed, FIG. 2E is a detailed cross-sectional front view of components, and FIG. 2F is a further detailed cross-sectional front view of components;

—FIG. 3A is a cross-sectional front view of the system without a cover, and FIG. 3B is a cross-sectional perspective view of the system with the cover;

—FIG. 4A is a cross-sectional front view of the system without a cover, and FIG. 4B is a cross-sectional perspective view of the system without the cover;

FIGS. 5A-5E include views of filtering elements for use in a filtering system according to exemplary embodiments of the present invention—FIG. 5A is a perspective view of a filtering element with an impermeable hollow extension, FIG. 5B is a front elevational view of the filtering element with the impermeable hollow extension, FIG. 5C is a perspective view of the filtering element with the impermeable hollow extension removed, FIG. 5D is a perspective view of the impermeable hollow extension and a cap of the filtering element, and FIG. 5E is a front elevational view of the filtering element with a longer impermeable hollow extension;

FIGS. 6A-6D include views of a filtering element for use in a filtering system according to another exemplary embodiment of the present invention—FIG. 6A is a perspective view of a filtering element with an impermeable solid extension, FIG. 6B is a front elevational view of the filtering element with the impermeable solid extension, FIG. 6C is a top plan view of the filtering element with the impermeable solid extension, and FIG. 6D is a cross-sectional front view of the filtering element with the impermeable solid extension;

—FIG. 7A is a perspective view of a filtering element with an impermeable primarily solid extension, FIG. 7B is a front elevational view of the filtering element with the impermeable primarily solid extension, FIG. 7C is a top plan view of the filtering element with the impermeable primarily solid extension, and FIG. 7D is a cross-sectional front view of the filtering element with the impermeable primarily solid extension;

—FIG. 8A is a cross-sectional front view, and FIG. 8B is a partial cross-sectional perspective view; and FIGS. 9A-9B include views of a filtering element for use in a filtering system for removing primarily particulates according to an exemplary embodiment of the present invention —FIG. 9A is a cross-sectional front view, and FIG. 9B is a partial cross-sectional perspective view;

where all cross-sectional views are taken in the specified direction through a central longitudinal axis of the filtering system.

DETAILED DESCRIPTION

Figure 1A:
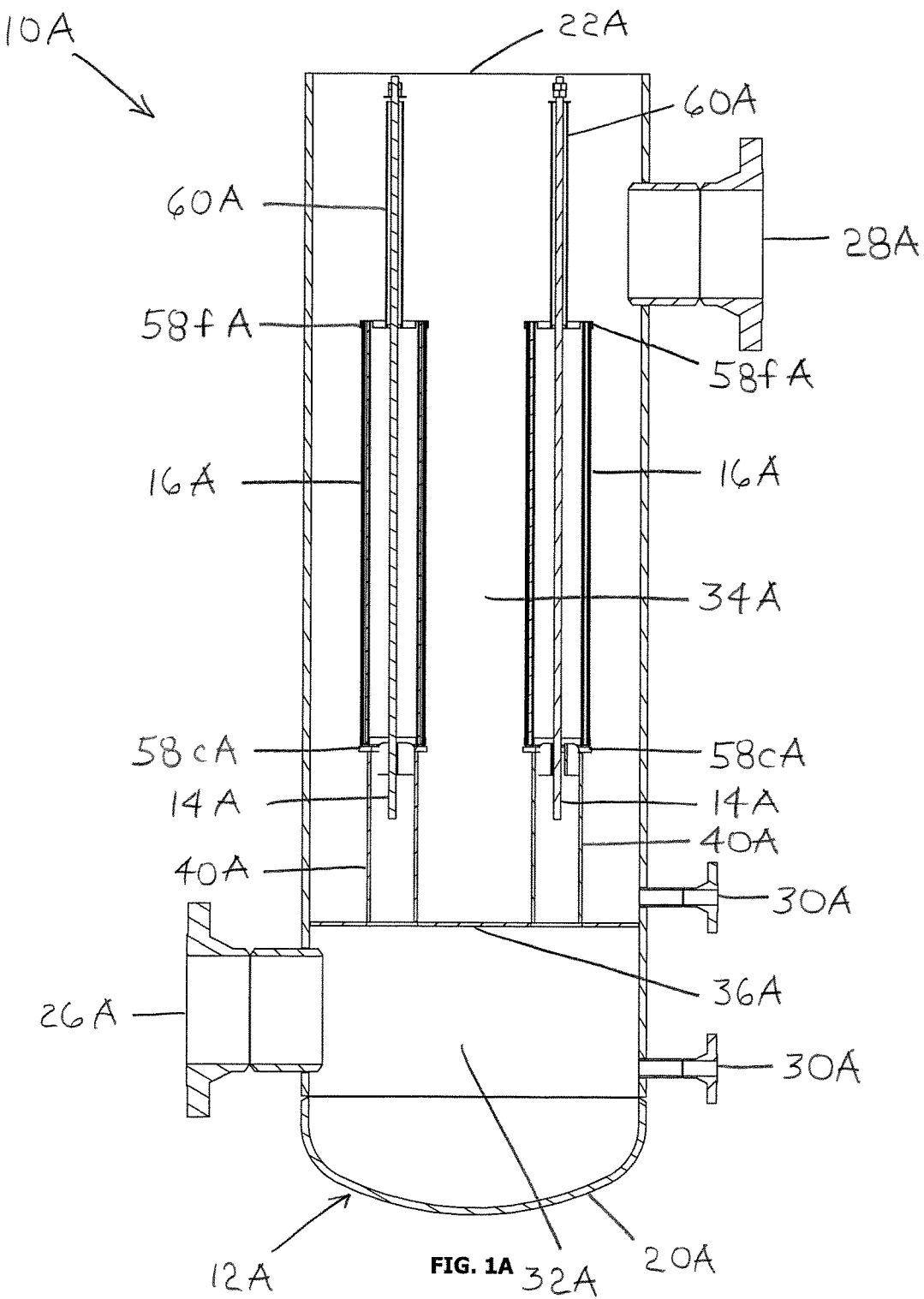
FIGS. 1A-1F include views of a filtering system and filtering system components for removing primarily aerosols according to an exemplary embodiment of the present invention
Figure 1B:
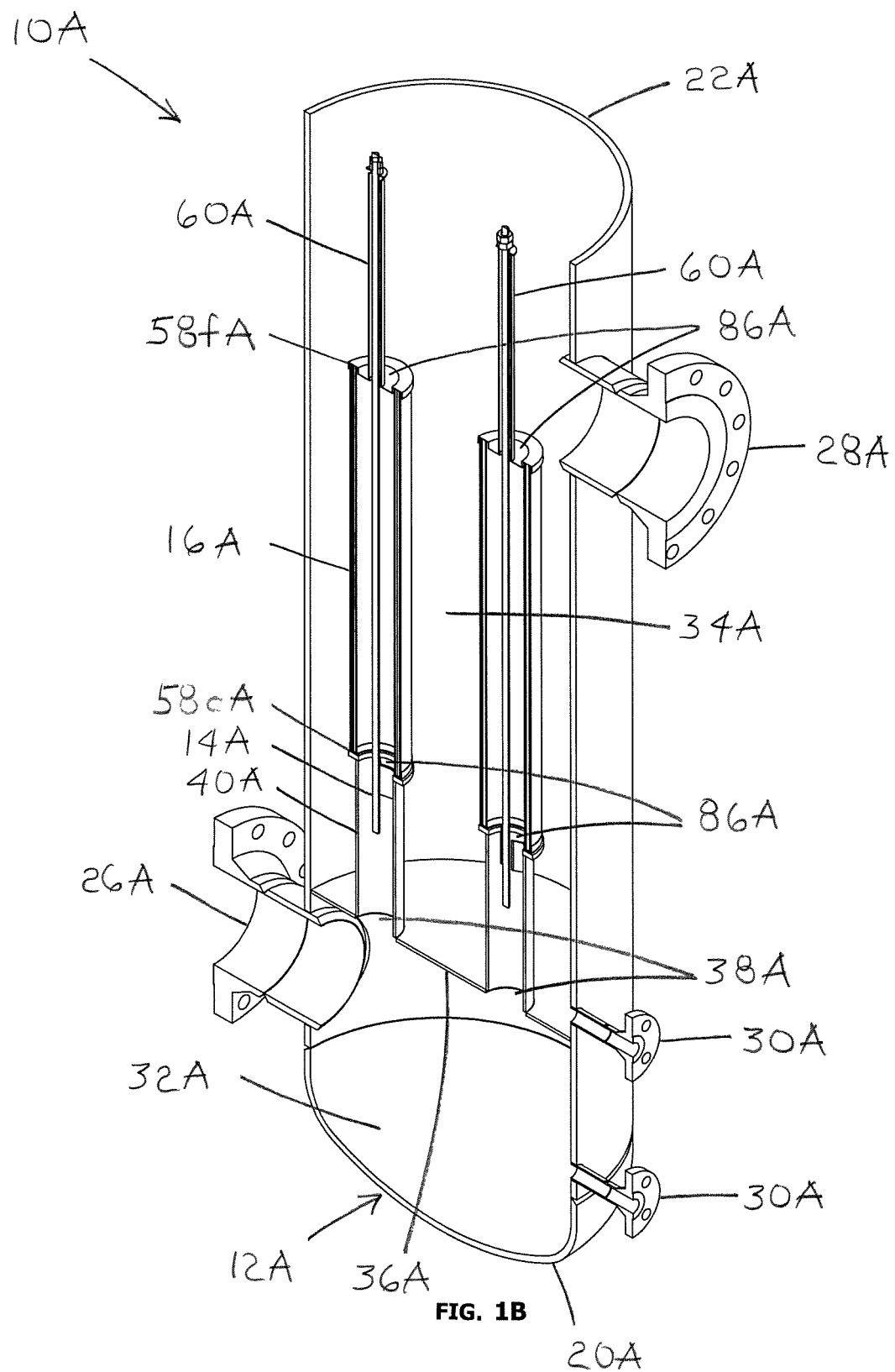
Figure 1C:
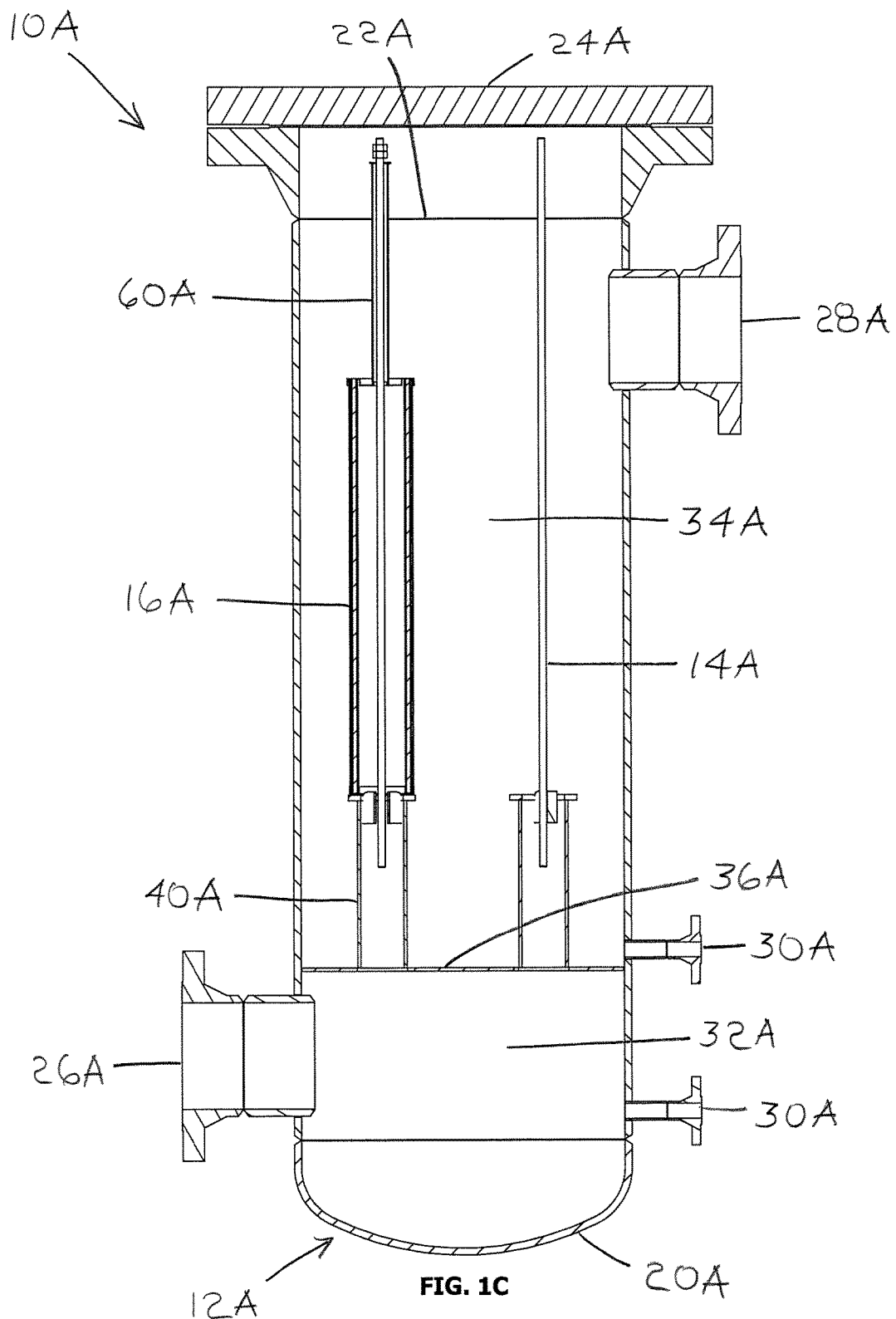
Figure 1D:
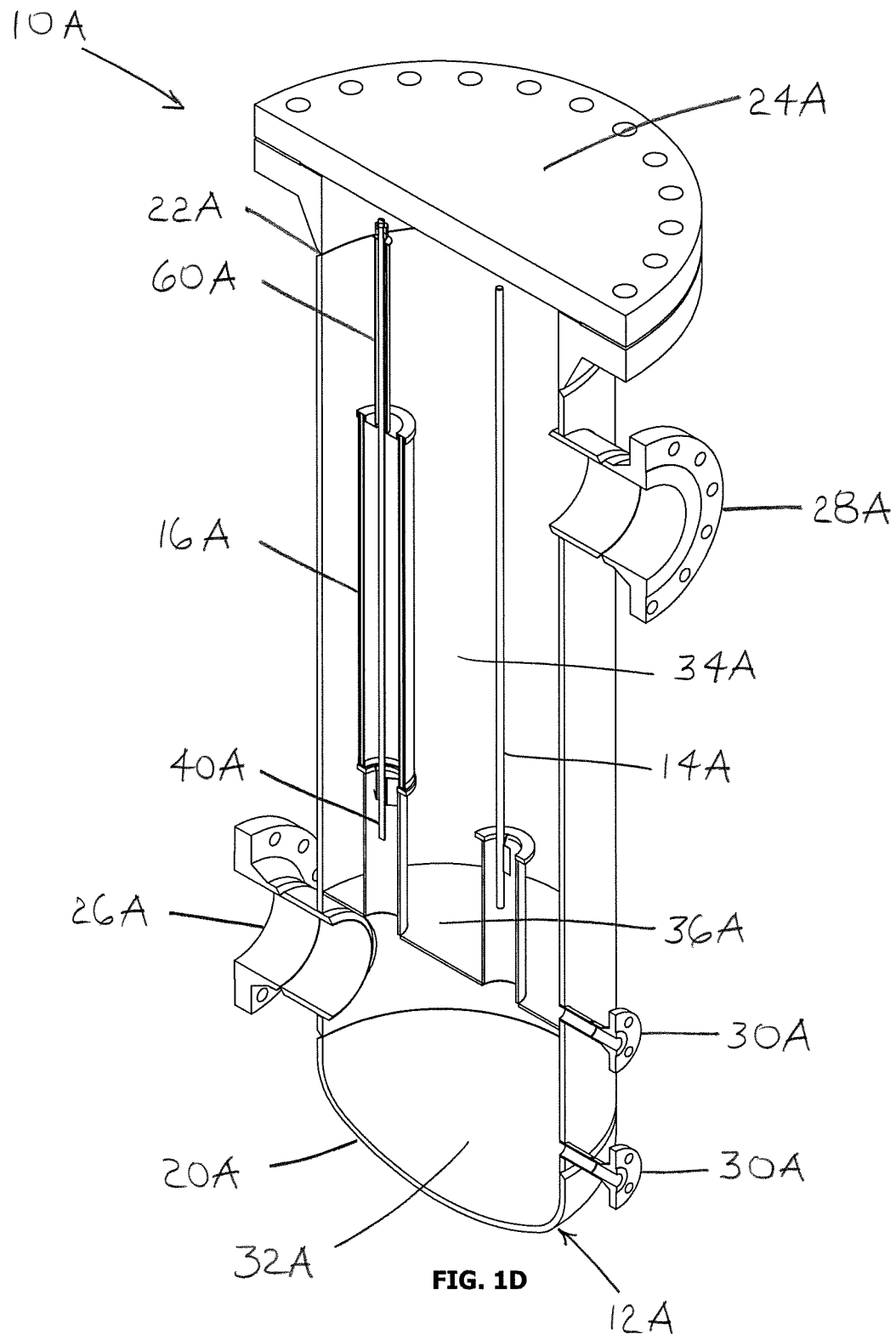
Figure 1E:
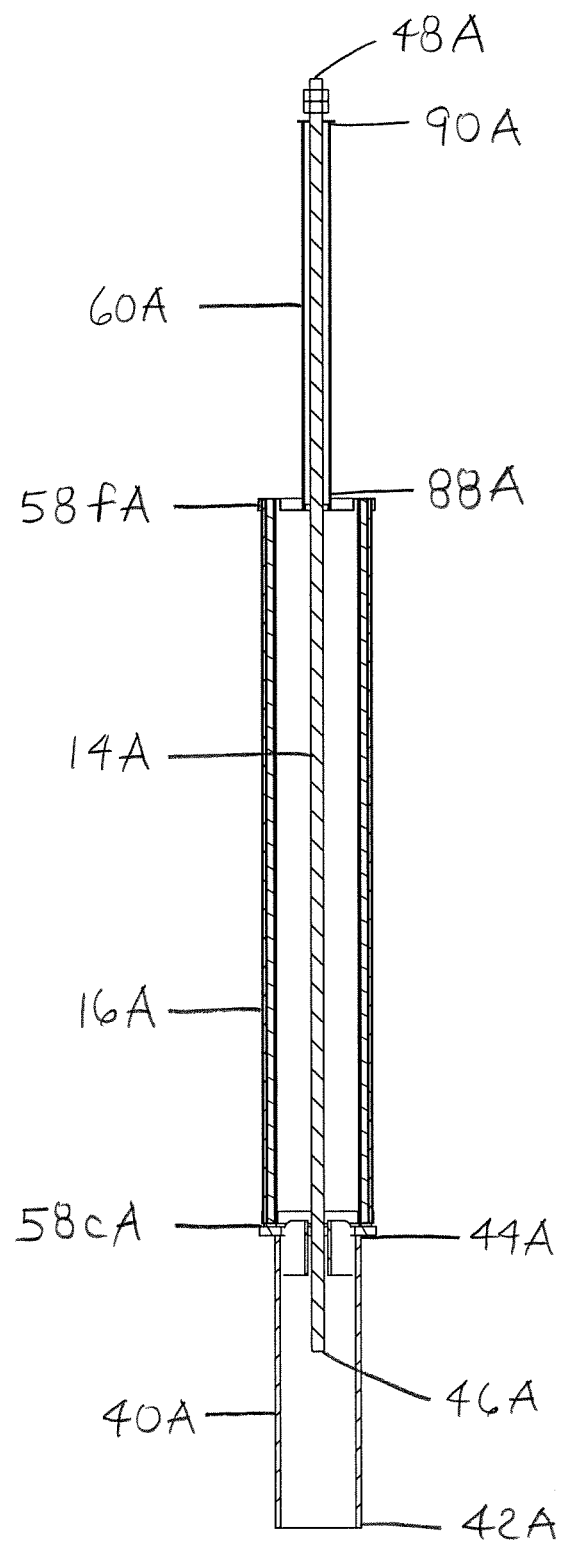
Figure 1F:
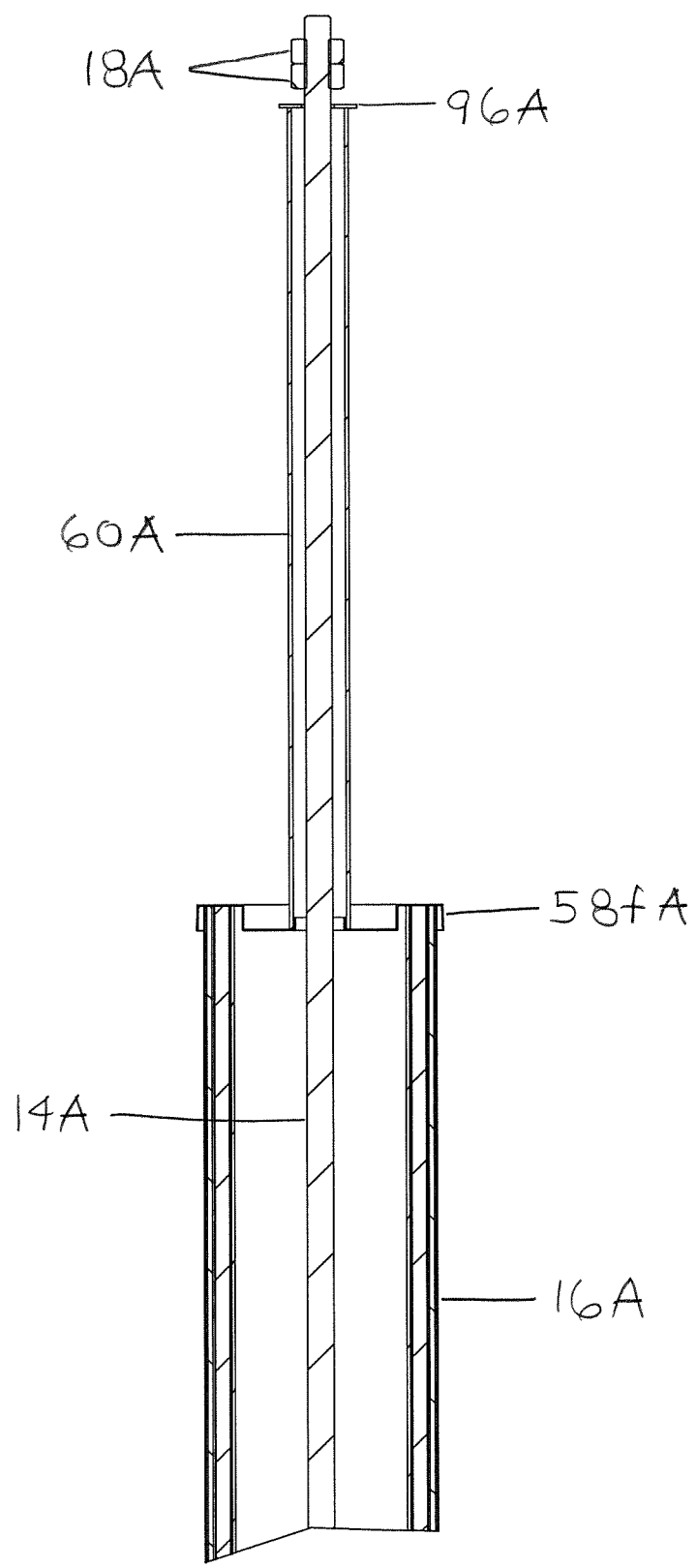
Figure 2A:
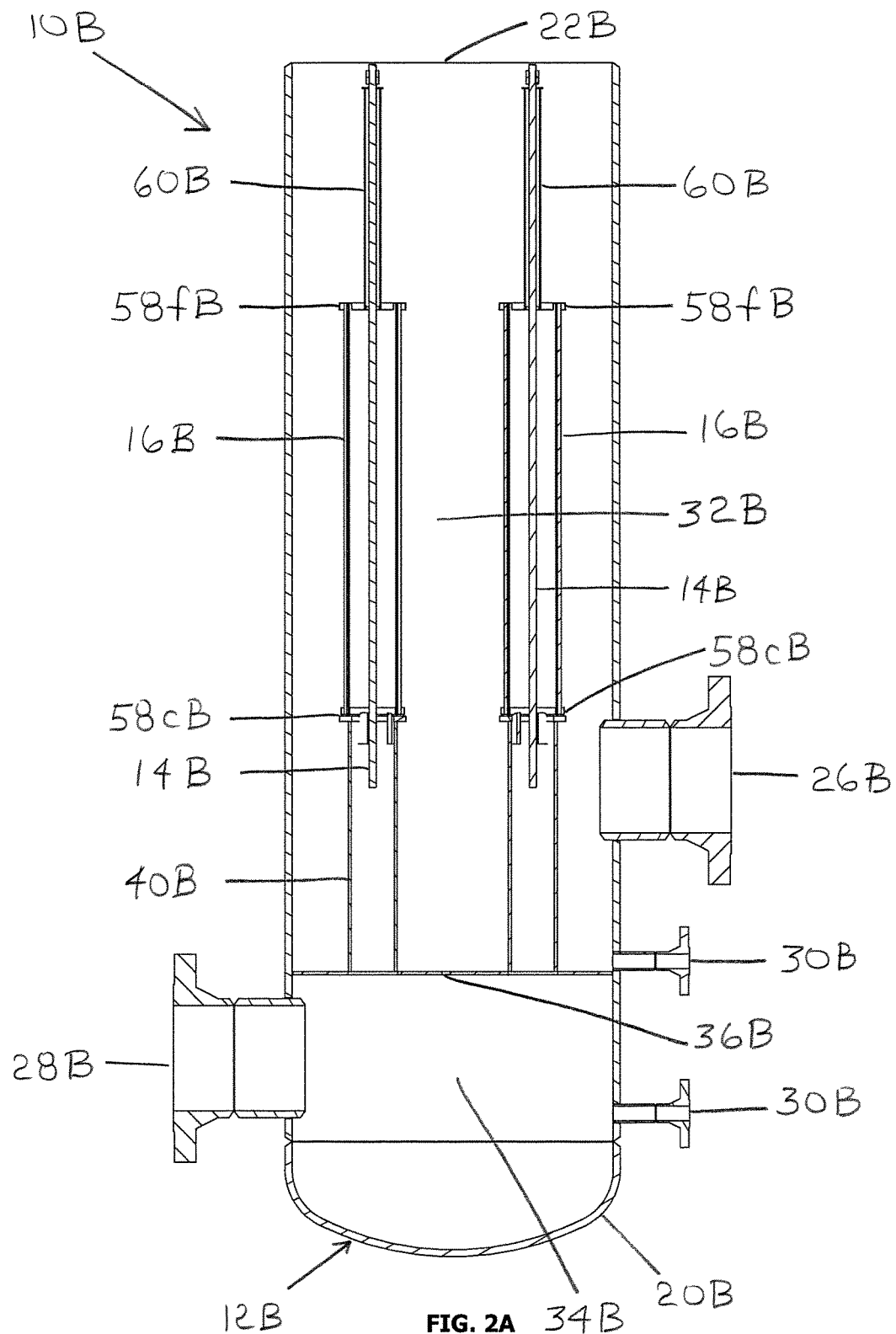
FIGS. 2A-2F include views of a filtering system and filtering system components for removing primarily particulates according to an exemplary embodiment of the present invention
Figure 2B:
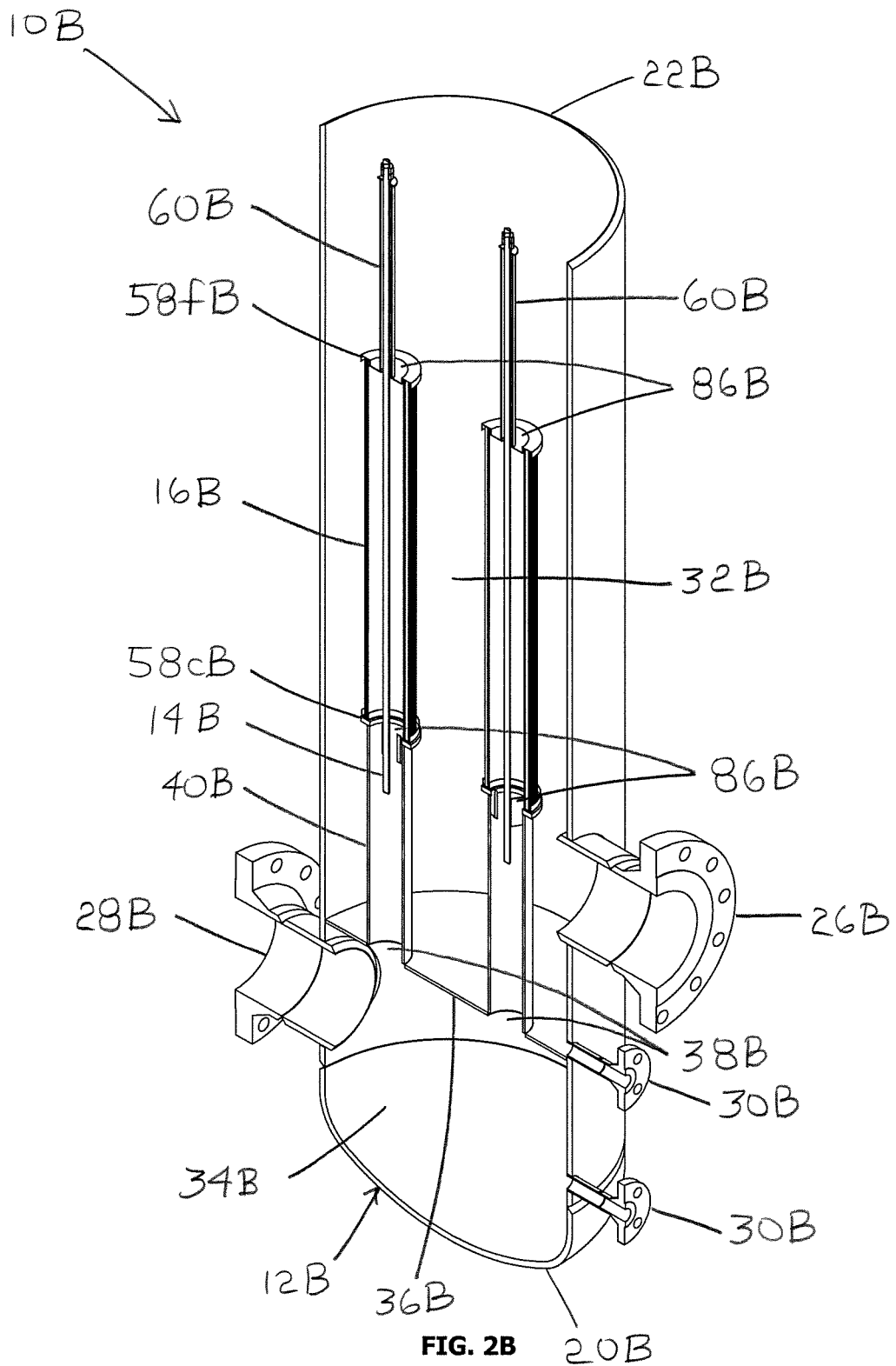
Figure 2C:
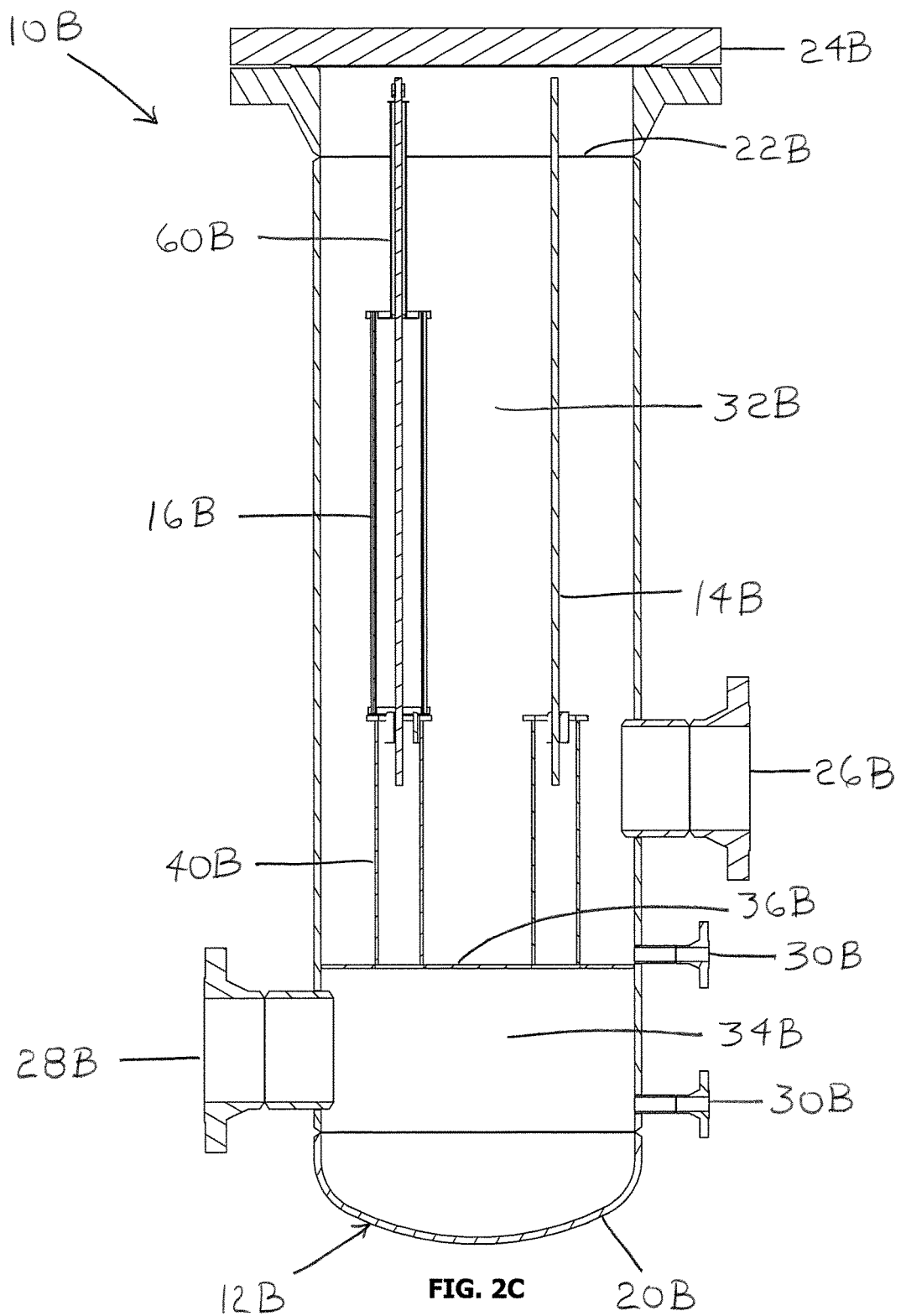
Figure 2D:
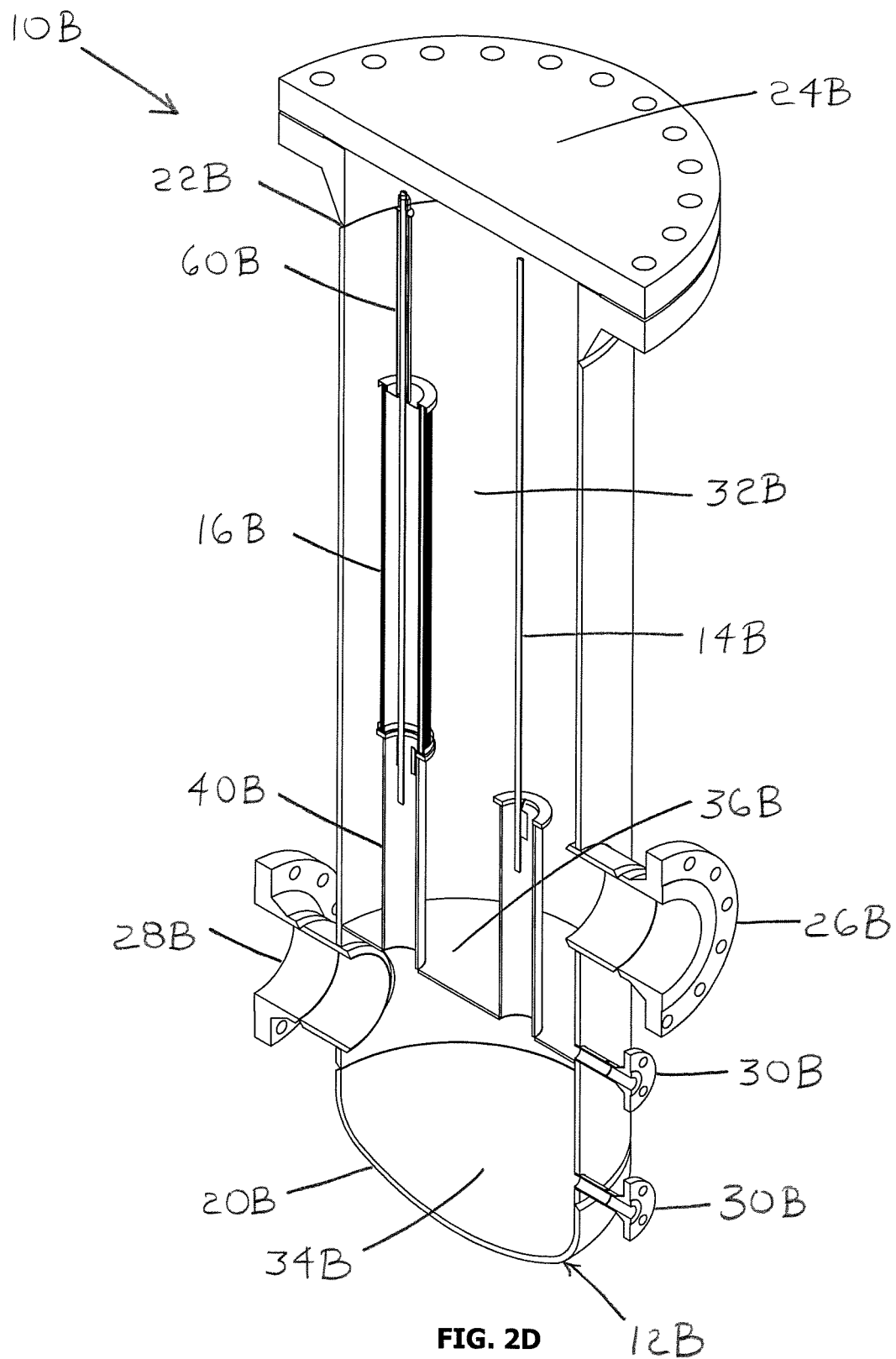
Figure 2E:
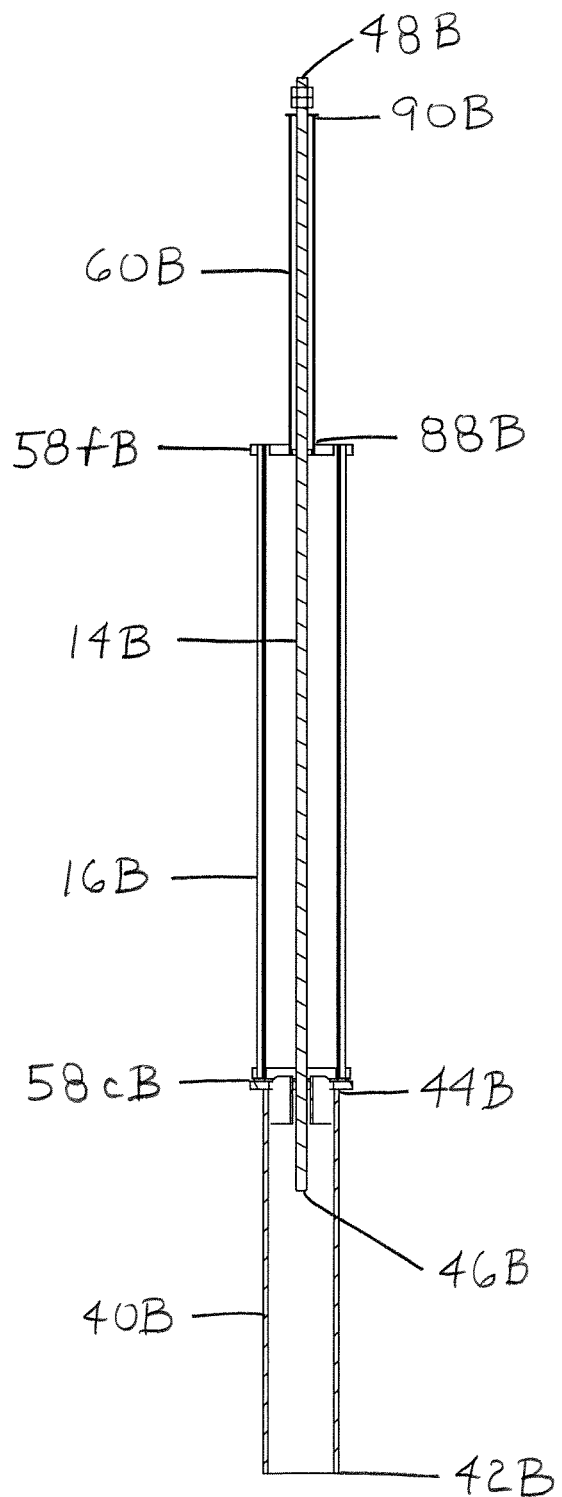
Figure 2F:
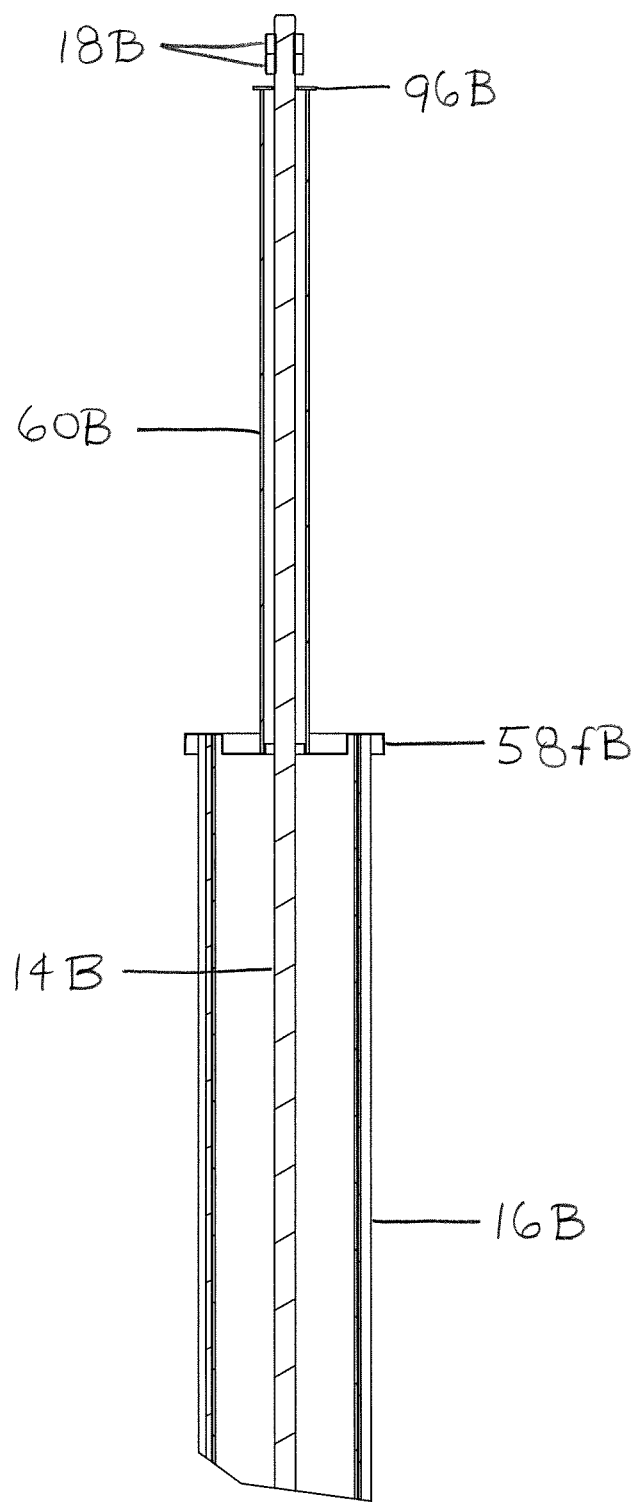
Figure 3A:
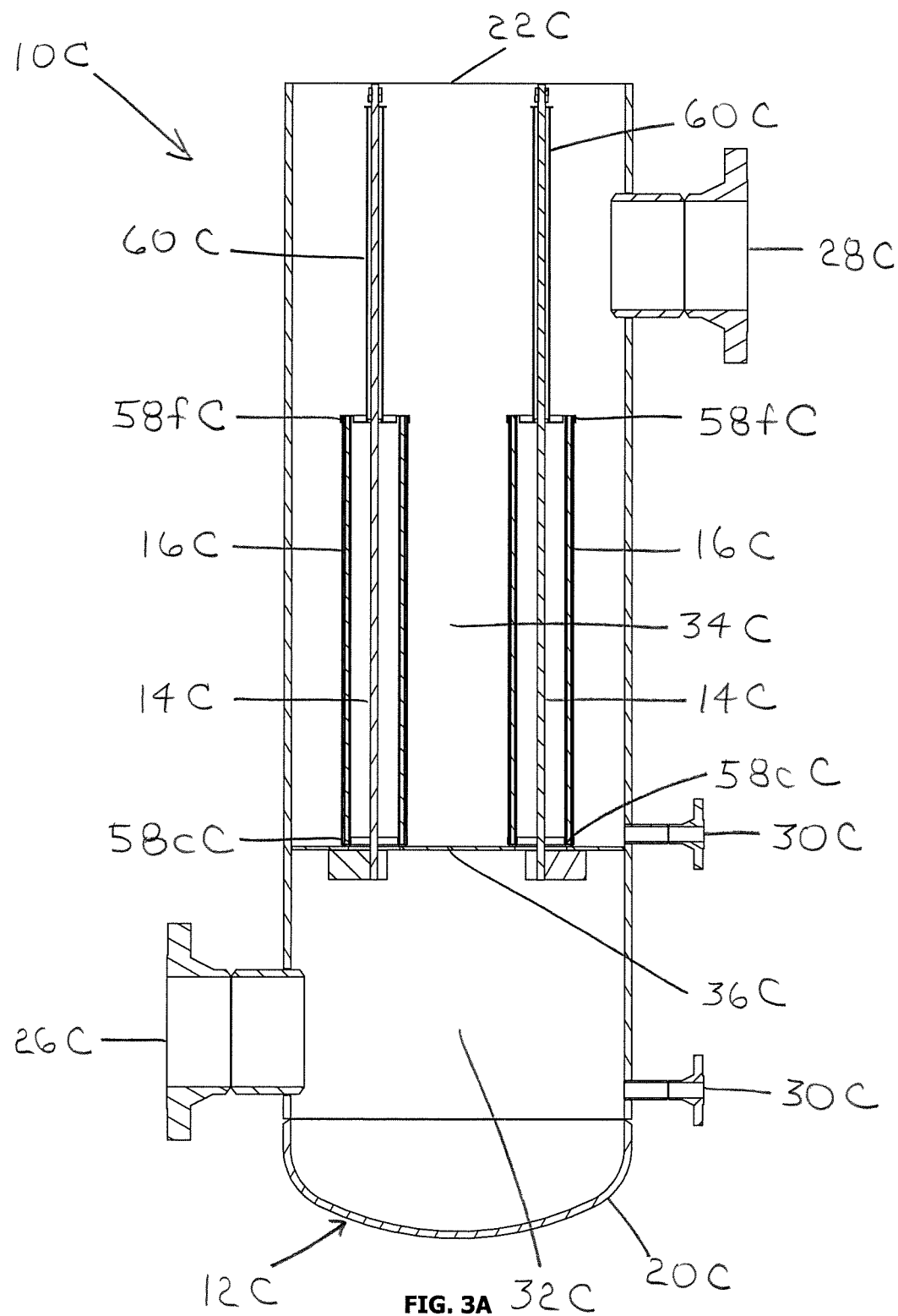
FIGS. 3A-3B include views of a filtering system and filtering system components for removing primarily aerosols according to another exemplary embodiment of the present invention
Figure 3B:
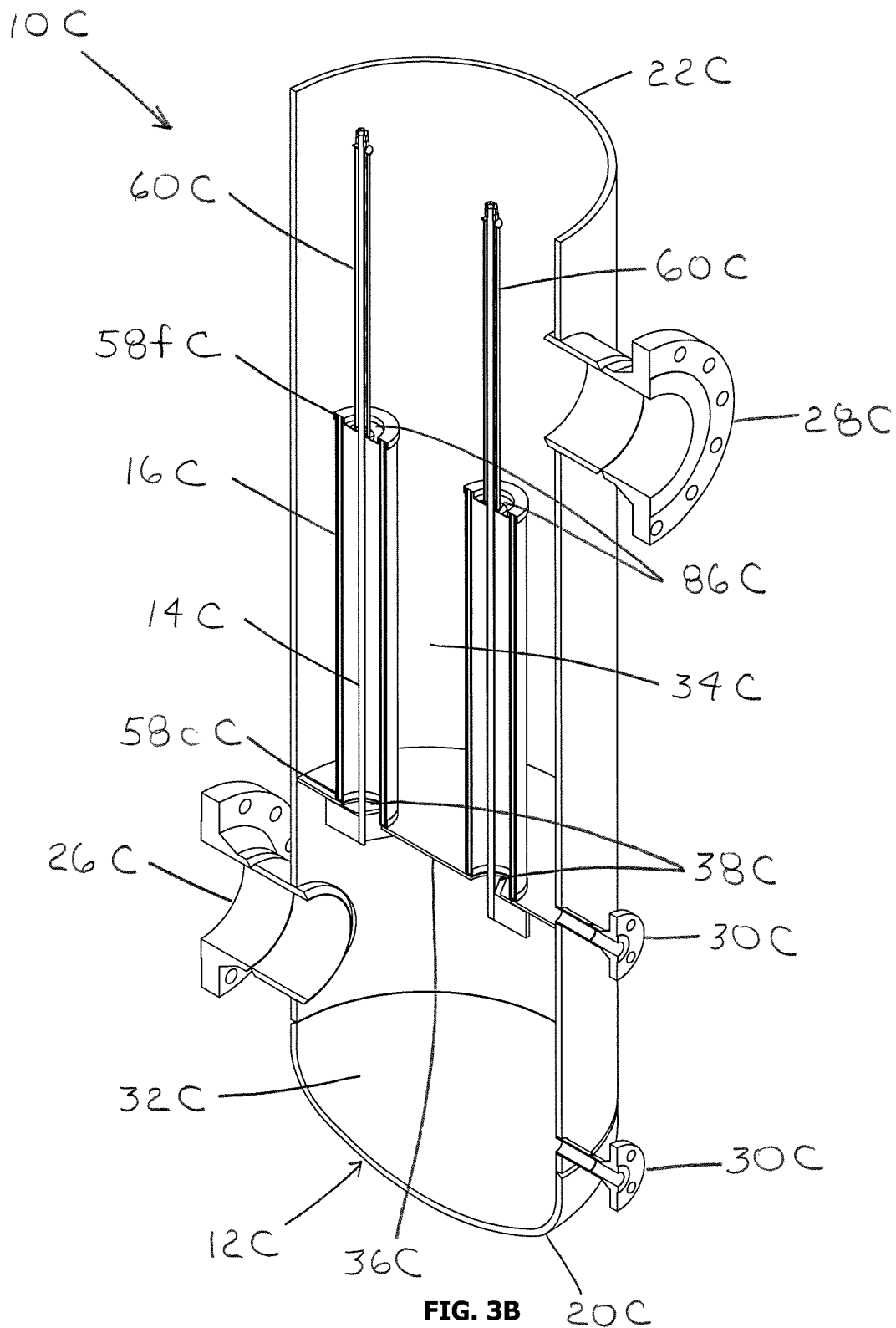
Figure 4A:
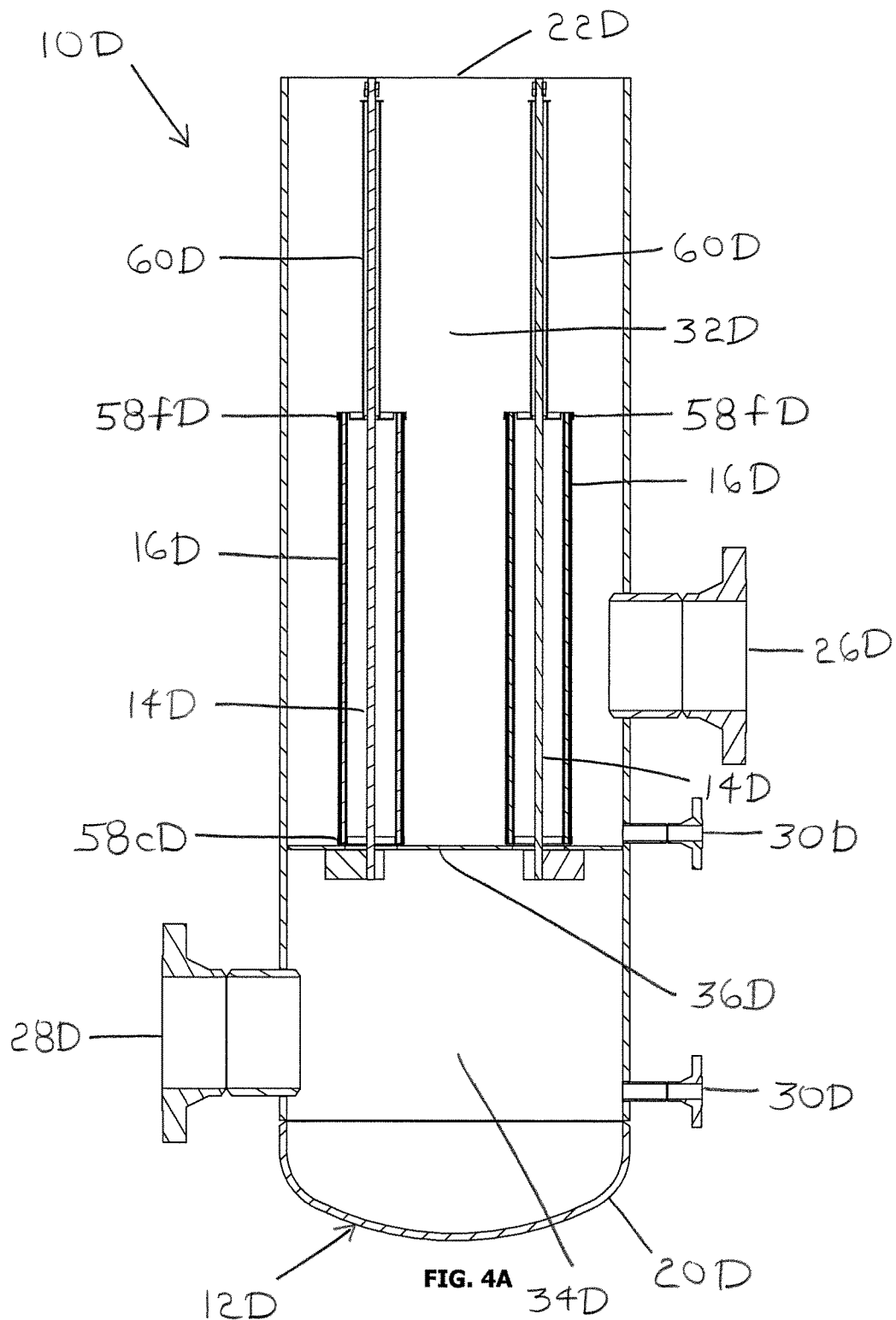
FIGS. 4A-4B include views of a filtering system and filtering system components for removing primarily particulates according to another exemplary embodiment of the present invention
Figure 4B:
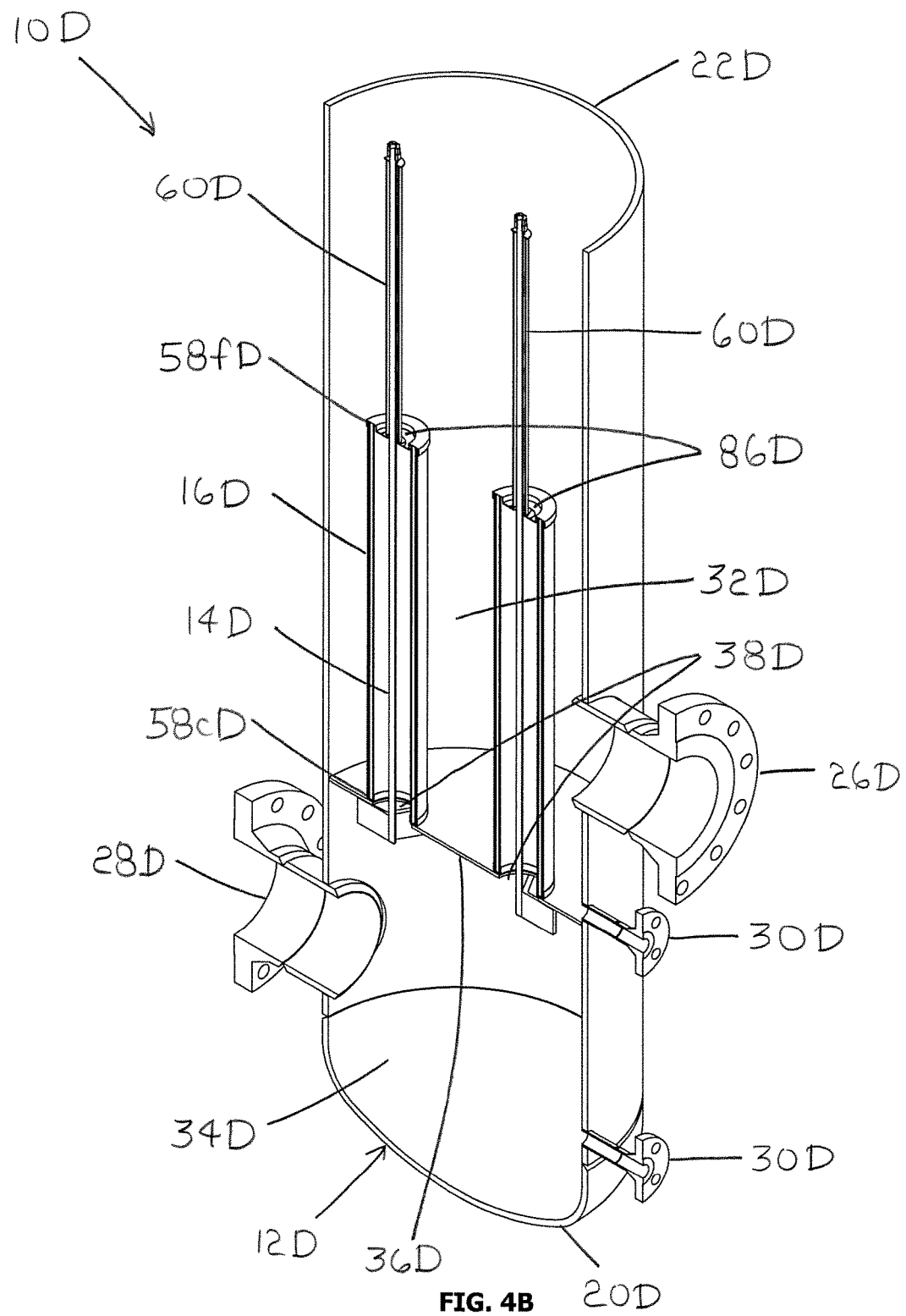
Figure 5A:
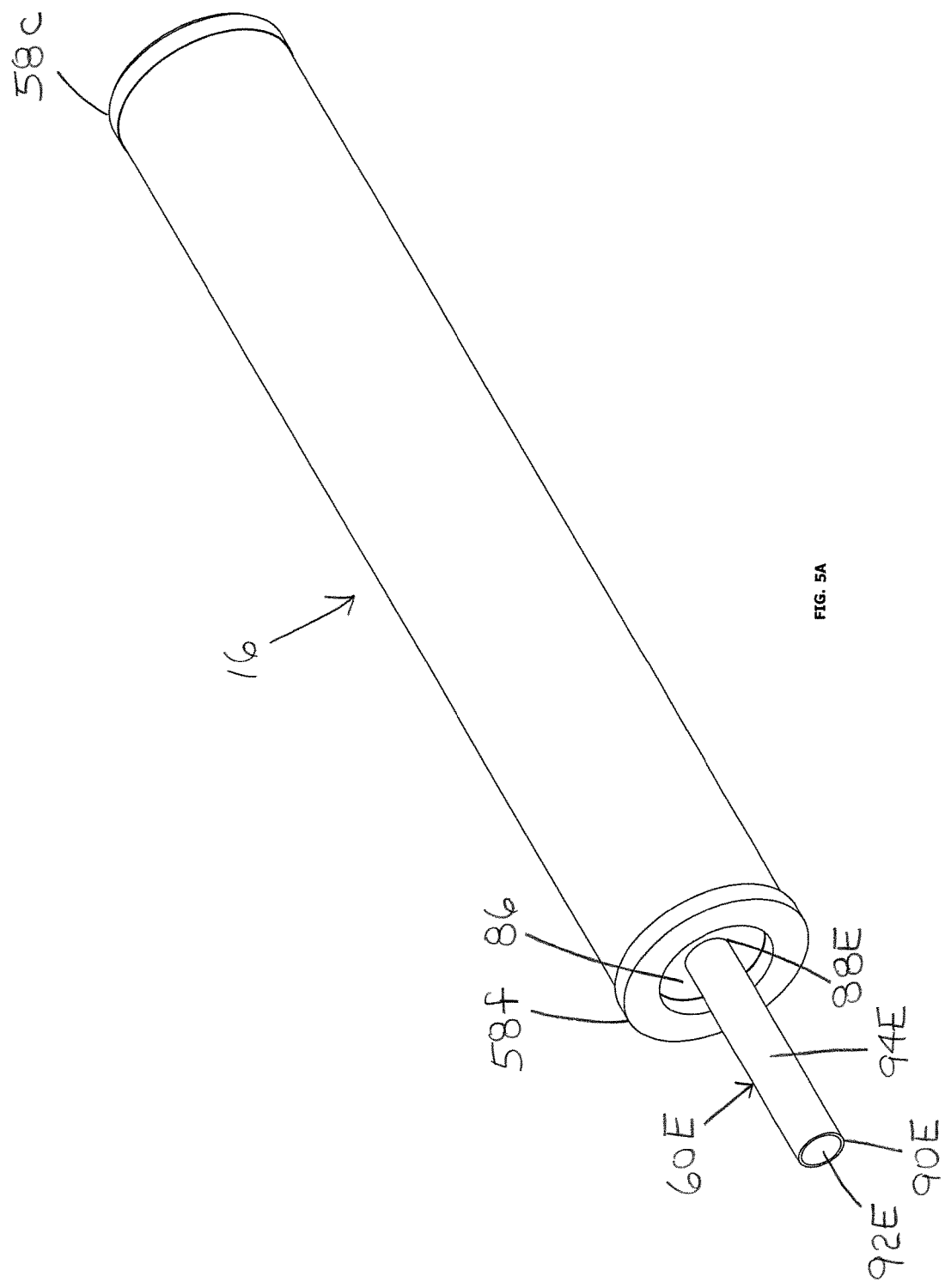
Figure 5B:
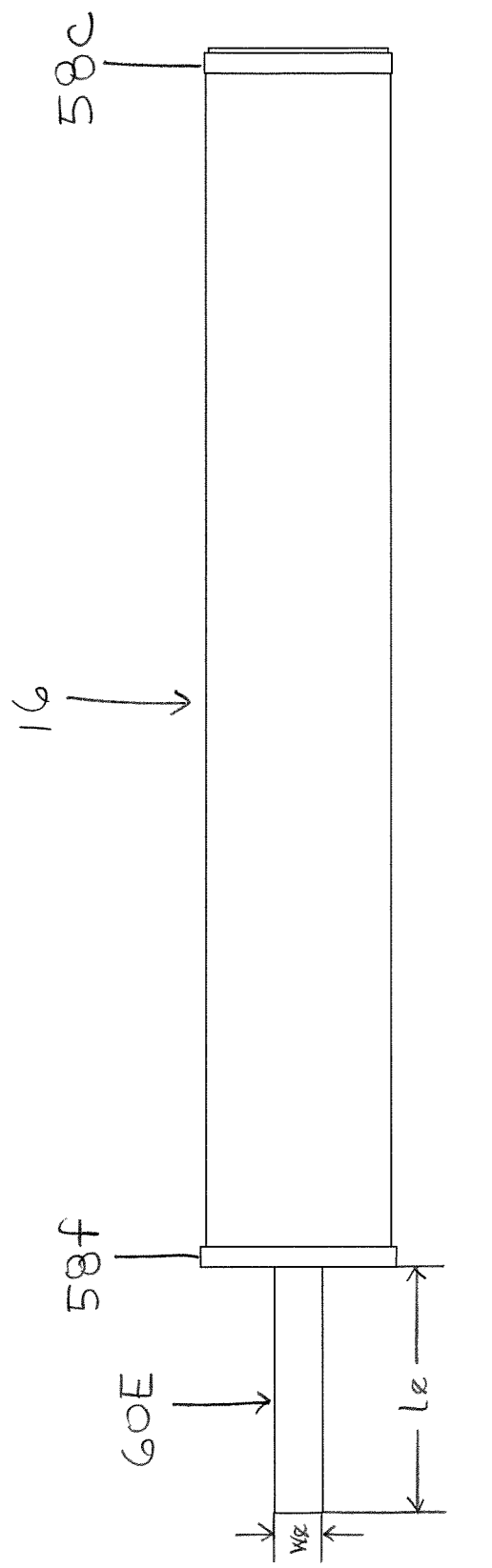
Figure 5D:
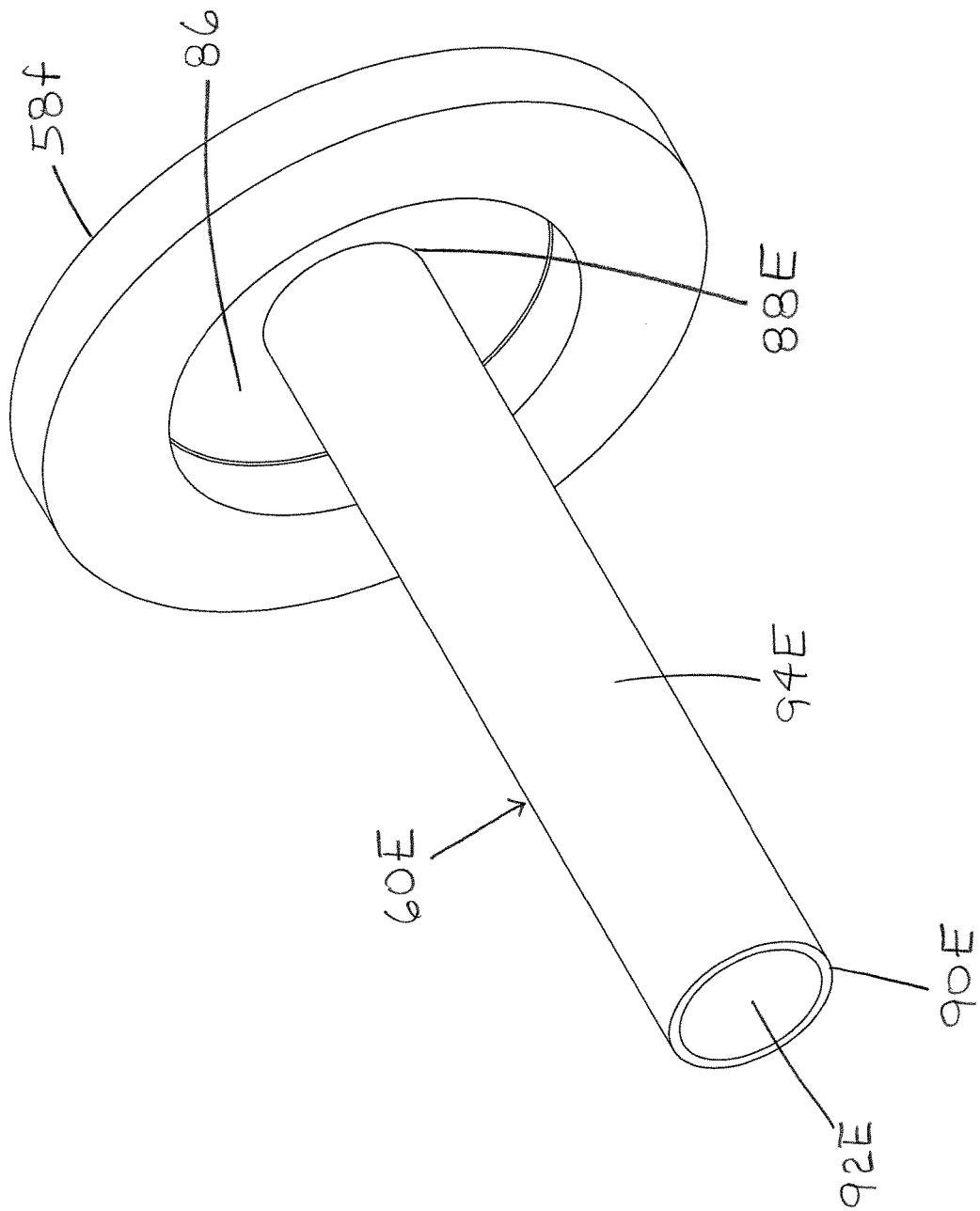
Figures 7A, 7B, 7C, 7D:
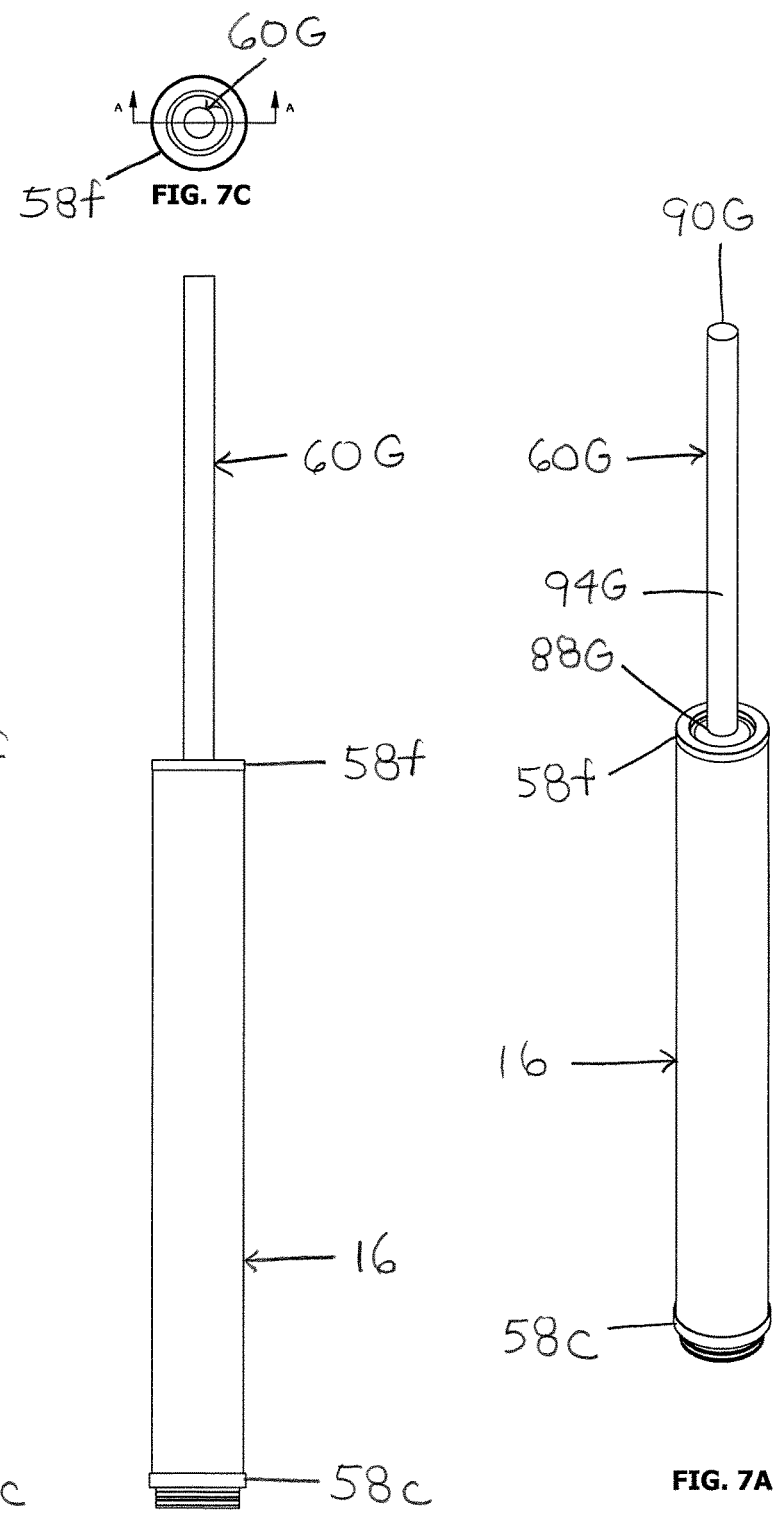
FIGS. 7A-7D include views of a filtering element for use in a filtering system according to another exemplary embodiment of the present invention
Figure 8A:
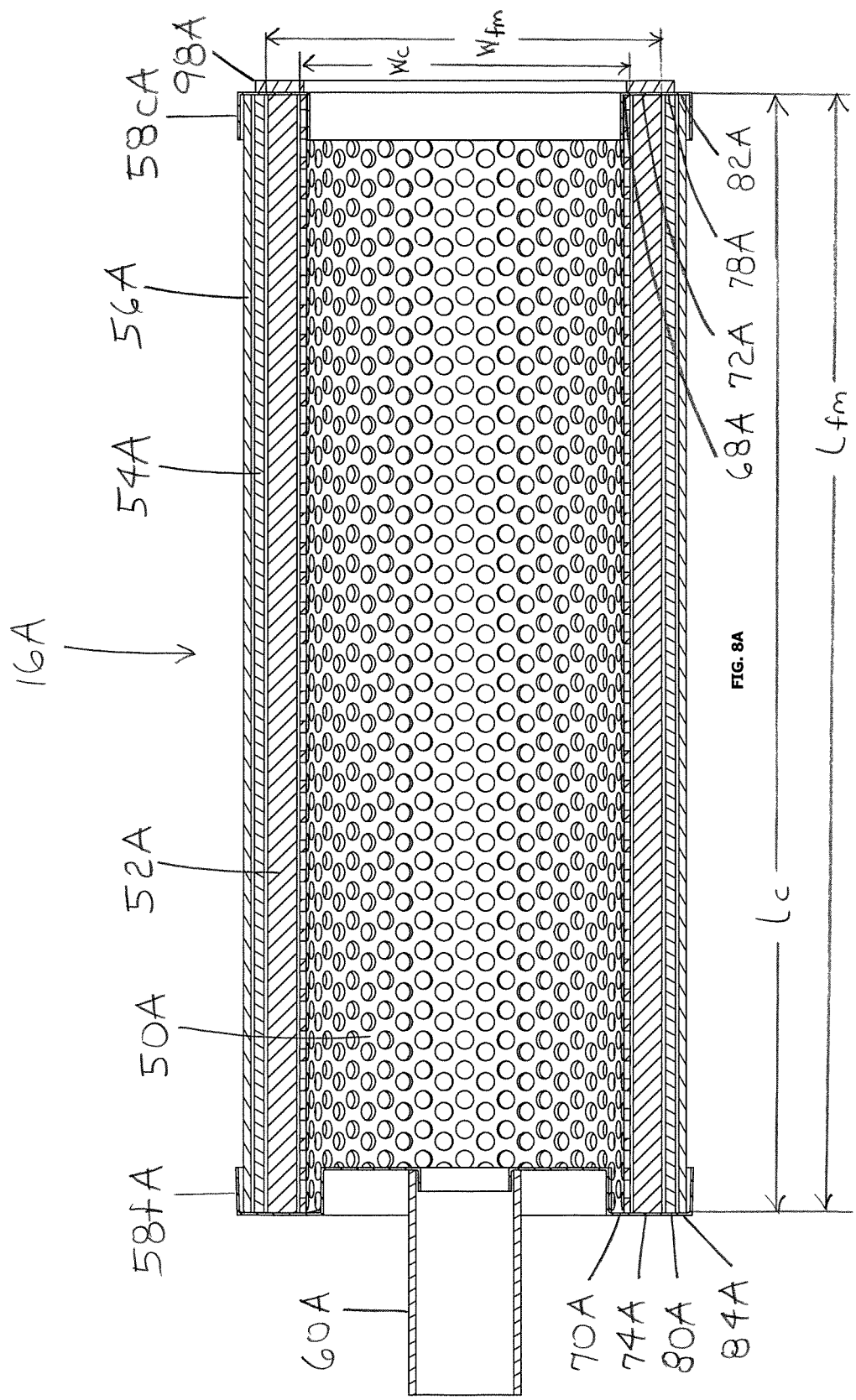
FIGS. 8A-8B include views of a filtering element for use in a filtering system for removing primarily aerosols according to an exemplary embodiment of the present invention
Figure 8B:
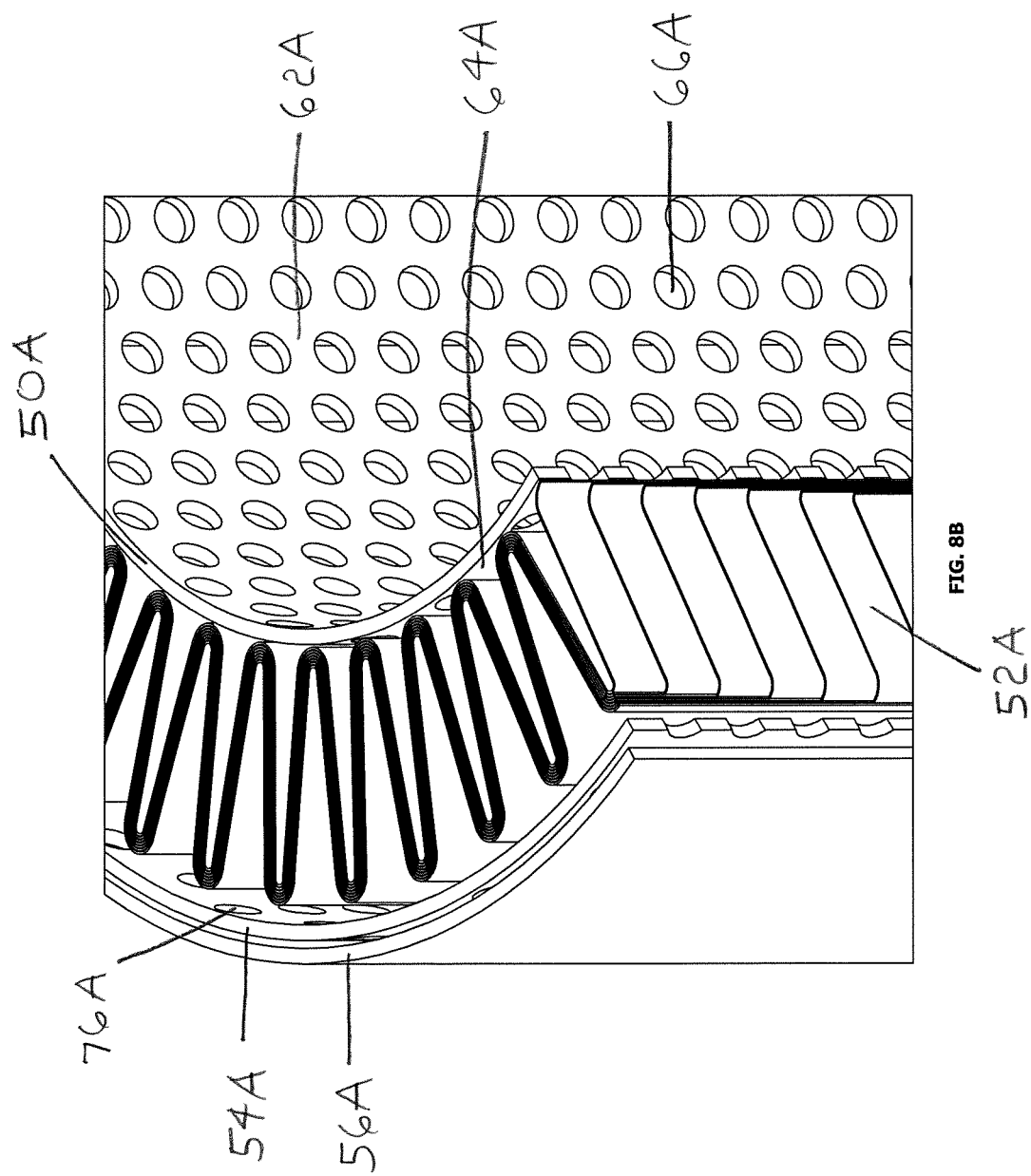
Figure 9A:
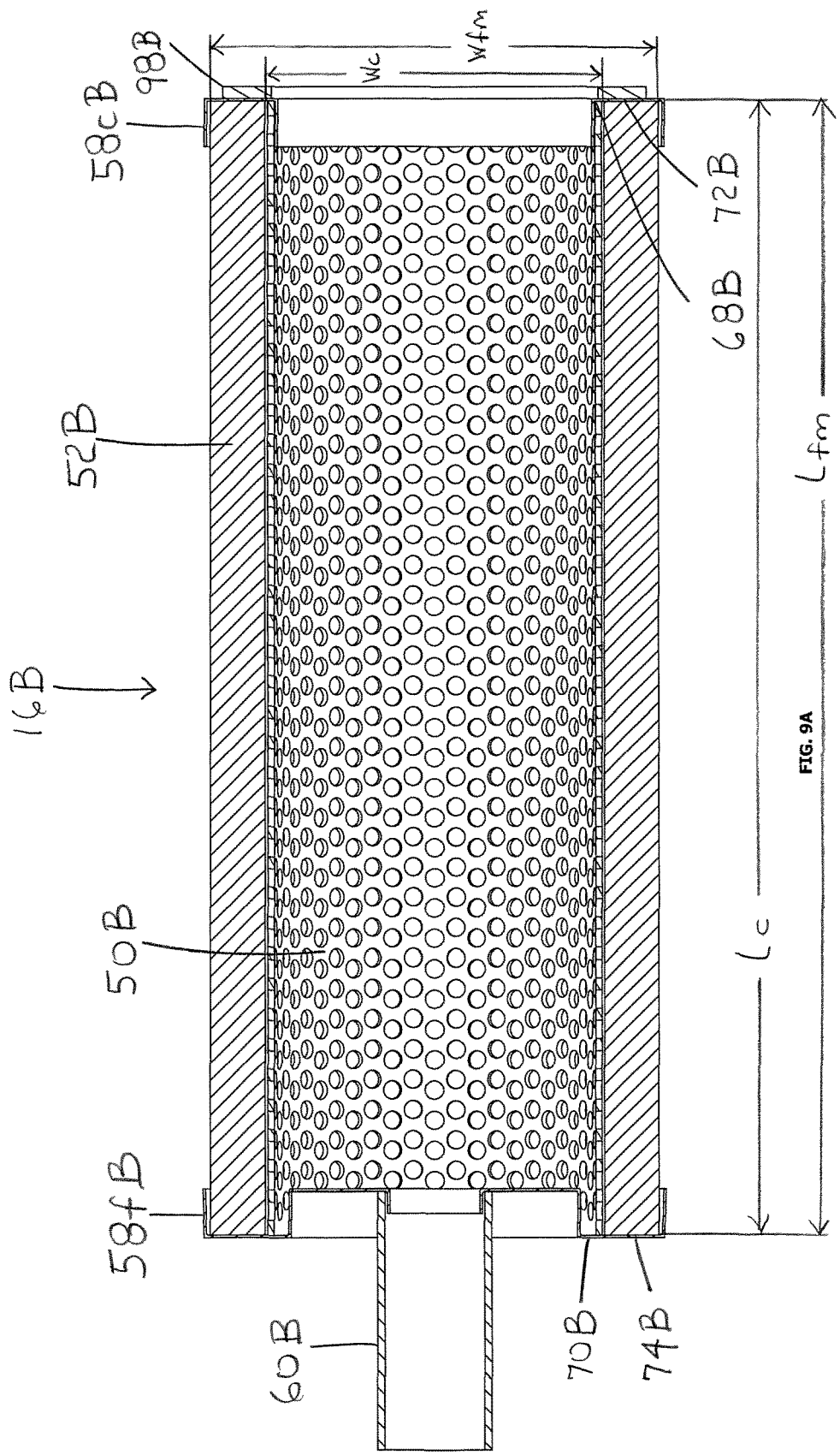

The present invention provides a filtering system including an impermeable extension for a filtering element. Exemplary embodiments of a filtering system 10 and filtering system components of the present invention are illustrated in FIGS. 1A-9B. The same reference numbers in combination with different letters (e.g., letters A, B, C, D, E, F, and G) and/or a prime symbol (e.g., symbol ') will be used to identify the different embodiments. A reference number alone or in combination with the letter X will be used to generically identify all embodiments (e.g., embodiments A, B, C, D, E, E', F, and G as shown in FIGS. 1A-1F and 8A-8B; 2A-2F and 9A-9B; 3A-3B; 4A-4B; 5A-5D; 5E; 6A-6D; and 7A-7D, respectively).

In exemplary embodiments, the filtering system 10X includes a vessel 12X, a vessel mounting rod 14X, a filtering element 16X, and a mounting nut 18X. In the illustrated embodiments of FIGS. 1A-1D, 2A-2D, 3A-3B, and 4A-4B, the filtering system 10X includes the vessel 12X, two (2) vessel mounting rods 14X, two (2) filtering elements 16X, and two (2) mounting nuts 18X.

The vessel 12X is operable to hold pressurized gas. The vessel 12X is hollow. In an exemplary embodiment, the vessel 12X is rigid. In an exemplary embodiment, the vessel 12X is generally cylindrical shaped. In an exemplary embodiment, the vessel 12X includes a closed end 20X and an open end 22X. In an exemplary embodiment, the vessel 12X includes a cover 24X operable to close the open end 22X. In an exemplary embodiment, the vessel 12X includes an inlet 26X, an outlet 28X, and a drain 30X. In the illustrated embodiments, the vessel 12X includes two (2) drains 30X. In the illustrated embodiments, the vessel 12X is installed in a vertical orientation. However, one of ordinary skill in the art will appreciate that the vessel 12X could be installed in a horizontal orientation.

The vessel 12X includes an inlet chamber 32X and an outlet chamber 34X. In the inlet chamber 32X, larger aerosols and particulates are removed from the gas. In the outlet chamber 34X, smaller aerosols and particulates are removed from the gas. In an exemplary embodiment, the inlet 26X is in the inlet chamber 32X, the outlet 28X is in the outlet chamber 34X, and one drain 30X is in each of the inlet chamber 32X and the outlet chamber 34X.

In the exemplary embodiment of the filtering system 10X for removing primarily aerosols as illustrated in FIGS. 1A-1D and 3A-3B, the inlet 26X and the inlet chamber 32X are in a bottom of the vessel 12X as illustrated, and the outlet 28X and the outlet chamber 34X are in a top of the vessel 12X as illustrated. In the exemplary embodiment of the filtering system 10X for removing primarily particulates as illustrated in FIGS. 2A-2D and 4A-4B, the inlet 26X and the inlet chamber 32X are in the top of the vessel 12X as illustrated, and the outlet 28X and the outlet chamber 34X are in the bottom of the vessel 12X as illustrated.

In an exemplary embodiment, the vessel 12X includes a partition 36X. The partition 36X separates the inlet chamber 32X and the outlet chamber 34X. In an exemplary embodiment, the partition 36X includes an opening 38X. In the illustrated embodiments, the partition 36X includes two (2) openings 38X. The opening 38X in the partition 36X is operable to fluidly connect the inlet chamber 32X to the outlet chamber 34X. In the illustrated embodiments, the partition 36X is a generally planar wall. However, one of ordinary skill in the art will appreciate that the partition 36X could have other shapes. For example, in an exemplary embodiment of a filtering system 10X for removing primarily aerosols that only includes a single filtering element 16X, the partition 36X could be a pipe that connects the inlet 26X to the filtering element 16X. Similarly, in an exemplary embodiment of a filtering system 10X for removing primarily particulates that only includes a single filtering element 16X, the partition 36X could be a pipe that connects the outlet 28X to the filtering element 16X.

In an exemplary embodiment, the vessel 12X includes a riser 40X. In the illustrated embodiments, the vessel 12X includes two (2) risers 40X. An exemplary embodiment of the riser 40X is shown in detail in FIGS. 1A-1D and 2A-2D. The riser 40X is operable to extend in one of the inlet chamber 32X and the outlet chamber 34X and to be fluidly connected to the other of the inlet chamber 32X and the outlet chamber 34X. The riser 40X is hollow. In an exemplary embodiment, the riser 40X is rigid. In an exemplary embodiment, the riser 40X is generally cylindrical shaped. In an exemplary embodiment, the riser 40X includes a vessel end 42X and a filter end 44X. In an exemplary embodiment, the vessel end 42X of the riser 40X is operable to cover the opening 38X in the partition 36X.

In the exemplary embodiment of the filtering system 10X for removing primarily aerosols as illustrated in FIGS. 1A-1D, the riser 40X is in the outlet chamber 34X, which is in the top of the vessel 12X as illustrated. In the exemplary embodiment of the filtering system 10X for removing primarily particulates as illustrated in FIGS. 2A-2D, the riser 40X is in the inlet chamber 32X, which is in the top of the vessel 12X as illustrated.

An exemplary embodiment of the vessel mounting rod 14X is shown in detail in FIGS. 1A-1F, 2A-2F, 3A-3B, and 4A-4B. The filtering element 16X is not shown in a right side of the vessel 12X in FIGS. 1C-1D and 2C-2D to better show the vessel mounting rod 14X. The vessel mounting rod 14X is operable to extend in one of the inlet chamber 32X and the outlet chamber 34X and to connect to the vessel 12X (and, more specifically, the riser 40X if the vessel 12X includes the riser 40X). In an exemplary embodiment, the vessel mounting rod 14X is solid. In an exemplary embodiment, the vessel mounting rod 14X is rigid. In an exemplary embodiment, the vessel mounting rod 14X includes a connected end 46X and a free end 48X. In an exemplary embodiment, the connected end 46X of the vessel mounting rod 14X (or a portion of the vessel mounting rod 14X near the connected end 46X) is operable to connect to the vessel 12X (e.g., the partition 36X or the riser 40X). In an exemplary embodiment, the free end 48X of the vessel mounting rod 14X (or a portion of the vessel mounting rod 14X near the free end 48X) is threaded, but is not operable to connect to any portion of the vessel 12X.

In the exemplary embodiment of the filtering system 10X for removing primarily aerosols as illustrated in FIGS. 1A-1F and 3A-3B, the vessel mounting rod 14X is in the outlet chamber 34X, which is in the top of the vessel 12X as illustrated. In the exemplary embodiment of the filtering system 10X for removing primarily particulates as illustrated in FIGS. 2A-2F and 4A-4B, the vessel mounting rod 14X is in the inlet chamber 32X, which is in the top of the vessel 12X as illustrated.

Exemplary embodiments of the filtering element 16X are shown in detail in FIGS. 1A-9B. The filtering element 16X is operable to extend in one of the inlet chamber 32X and the outlet chamber 34X of the vessel 12X. In the exemplary embodiment of the filtering system 10X for removing primarily aerosols as illustrated in FIGS. 1A-1F and 3A-3B, the filtering element 16X is in the outlet chamber 34X, which is in the top of the vessel 12X as illustrated. In the exemplary embodiment of the filtering system 10X for removing primarily particulates as illustrated in FIGS. 2A-2F and 4A-4B, the filtering element 16X is in the inlet chamber 32X, which is in the top of the vessel 12X as illustrated.

In an exemplary embodiment of a filtering element 16X for removing primarily aerosols, as best shown in FIGS. 1A-1F, 3A-3B, and 8A-8B, the filtering element 16X includes a core 50X, a filtering medium 52X, a housing 54X, a drip medium 56X, two (2) caps 58X, and an extension 60X. In an exemplary embodiment of a filtering element 16X for removing primarily particulates, as best shown in FIGS. 2A-2F, 4A-4B, and 9A-9B, the filtering element 16X includes a core 50X, a filtering medium 52X, the two (2) caps 58X, and the extension 60X.

The core 50X is operable to extend in one of the inlet chamber 32X and the outlet chamber 34X of the vessel 12X. The core 50X is hollow. The core 50X has an interior 62X and an exterior 64X. In an exemplary embodiment, the core 50X is rigid. In an exemplary embodiment, the core 50X has perforations 66X. In an exemplary embodiment, the core 50X is generally cylindrical shaped. In an exemplary embodiment, the core 50X includes a connected end 68X and a free end 70X. The core 50X has a length $l_c$ and a width $w_c$. In an exemplary embodiment, the length $l_c$ of the core 50X is greater than the width $w_c$ of the core 50X. In an exemplary embodiment, the core 50X is operable to receive the vessel mounting rod 14X extending through the interior 62X of the core 50X. In an exemplary embodiment, the core 50X is formed from a metal. In an exemplary embodiment, the core 50X is formed from a plastic. In an exemplary embodiment, the core 50X is formed from at least one of a metal and a plastic.

In the exemplary embodiment of the filtering system 10X for removing primarily aerosols as illustrated in FIGS. 1A-1F and 3A-3B, the core 50X is in the outlet chamber 34X, which is in the top of the vessel 12X as illustrated. In the exemplary embodiment of the filtering system 10X for removing primarily particulates as illustrated in FIGS. 2A-2F and 4A-4B, the core 50X is in the inlet chamber 32X, which is in the top of the vessel 12X as illustrated.

The filtering medium 52X is operable to extend around the core 50X. The filtering medium 52X is permeable. In an exemplary embodiment, the filtering medium 52X is formed from a fibrous material. In an exemplary embodiment, the filtering medium 52X is pleated. In an exemplary embodiment, the filtering medium 52X includes a connected end 72X and a free end 74X. The filtering medium 52X has a length $l_{fm}$ and a width $w_{fm}$. In an exemplary embodiment, the filtering medium 52X is operable to remove primarily aerosols from the pressurized gas. In an exemplary embodiment, the filtering medium 52X is operable to remove primarily particulates from the pressurized gas.

The housing 54X is operable to extend around the core 50X and the filtering medium 52X. The housing 54X is hollow. In an exemplary embodiment, the housing 54X is rigid. In an exemplary embodiment, the housing 54X has perforations 76X. In an exemplary embodiment, the housing 54X is generally cylindrical shaped. In an exemplary embodiment, the housing 54X includes a connected end 78X and a free end 80X. In an exemplary embodiment, the housing 54X is formed from a metal. In an exemplary embodiment, the housing 54X is formed from a plastic. In an exemplary embodiment, the housing 54X is formed from at least one of a metal and a plastic.

The drip medium 56X is operable to extend along the housing 54X. In an exemplary embodiment, the drip medium 56X is non-rigid. In an exemplary embodiment, the drip medium 56X is formed of a felt-like material. In an exemplary embodiment, the drip medium 56X extends outside the housing 54X. In an exemplary embodiment, the drip medium 56X extends inside the housing 54X. In an exemplary embodiment, the drip medium 56X includes a connected end 82X and a free end 84X.

In an exemplary embodiment, the filtering element 16X is operable to have the pressurized gas pass therethrough. In the exemplary embodiment of the filtering system 10X for removing primarily aerosols (including the core 50X, the filtering medium 52X, the housing 54X, and the drip medium 56X) as illustrated in FIGS. 1A-1F and 3A-3B, the pressurized gas passes from the interior 62X of the core 50X through the filtering medium 52X, the housing 54X, and the drip medium 56X. In the exemplary embodiment of the filtering system 10X for removing primarily particulates (including the core 50X and the filtering medium 52X) as illustrated in FIGS. 2A-2F and 4A-4B, the pressurized gas passes through the filtering medium 52X and the core 50X to the interior 62X of the core 50X.

In an exemplary embodiment, one cap 58X is a connected cap 58cX and the other cap 58X is a free cap 58fX. In an exemplary embodiment, the connected cap 58cX is operable to cover and connect to the connected end 68X of the core 50X, the connected end 72X of the filtering medium 52X, the connected end 78X of the housing 54X, and/or the connected end 82X of the drip medium 56X. In an exemplary embodiment, the connected cap 58cX is connected to the connected end 68X of the core 50X, the connected end 72X of the filtering medium 52X, the connected end 78X of the housing 54X, and/or the connected end 82X of the drip medium 56X using an adhesive, such as a potting epoxy. In an exemplary embodiment, the free cap 58fX is operable to cover and connect to the free end 70X of the core 50X, the free end 74X of the filtering medium 52X, the free end 80X of the housing 54X, and/or the free end 84X of the drip medium 56X. In an exemplary embodiment, the free cap 58fX is connected to the free end 70X of the core 50X, the free end 74X of the filtering medium 52X, the free end 80X of the housing 54X, and/or the free end 84X of the drip medium 56X using an adhesive, such as a potting epoxy. In an exemplary embodiment, each cap 58X includes an opening 86X. In an exemplary embodiment, each cap 58X is operable to receive the vessel mounting rod 14X through the opening 86X.

The extension 60X is operable to connect to the free cap 58fX. In exemplary embodiments, the extension 60X is connected to the free cap 58fX using welding and/or an adhesive, such as a potting epoxy. In an exemplary embodiment, the extension 60X is rigid. The extension 60X is impermeable. In an exemplary embodiment, the extension 60X includes a connected end 88X and a free end 90X. The extension 60X has a length $l_e$, $l_{e'}$ and a width $w_e$, $w_{e'}$. In an exemplary embodiment, the connected end 88X of the extension 60X is operable to connect to the free cap 58fX. In an exemplary embodiment, the extension 60X is not operable to connect to any portion of the vessel 12X. In an exemplary embodiment, the free end 90X of the extension 60X is not operable to connect to any portion of the vessel 12X. In an exemplary embodiment, the width $w_e$, $w_{e'}$ of the extension 60X is less than the width $w_{fm}$ of the filtering medium 52X. In an exemplary embodiment, the length $l_e$, $l_{e'}$ of the extension 60X is greater than the width $w_e$, $w_{e'}$ of the extension 60X. In an exemplary embodiment, the extension 60X has a generally constant width $w_e$, $w_{e'}$. In an exemplary embodiment, the extension 60X is separately formed from the free cap 58fX. In an exemplary embodiment, the extension 60X is integrally formed with the free cap 58fX. In an exemplary embodiment, the extension 60X is formed from a metal. In an exemplary embodiment, the extension 60X is formed from a plastic. In an exemplary embodiment, the extension 60X is formed from at least one of a metal and a plastic.

In exemplary embodiments as shown in FIGS. 1A-1F, 2A-2F, 3A-3B, 4A-4B, 8A-8B, and 9A-9B, and more specifically in FIGS. 5A-5E, the extension 60X, 60E, 60E' is hollow. In the exemplary embodiments where the extension 60E is hollow, the extension 60E has an interior 92E and an exterior 94E. In the illustrated embodiment where the extension 60E is hollow, the extension 60E has a generally circular-shaped cross-section. However, one of ordinary skill in the art will appreciate that the extension 60E could have other shapes. For example, the extension 60E could have a generally square-shaped cross-section. In the exemplary embodiments where the extension 60E is hollow, the extension 60E is operable to receive the vessel mounting rod 14X extending through the interior 92E of the extension 60E.

In an exemplary embodiment as shown in FIGS. 6A-6D, an extension 60F is solid. In the exemplary embodiment where the extension 60F is solid, the extension 60F has an exterior 94F. In the illustrated embodiment where the extension 60F is solid, the extension 60F has a generally L-shaped cross-section. However, one of ordinary skill in the art will appreciate that the extension 60F could have other shapes. For example, the extension 60F could have a generally circular-shaped cross-section. In the exemplary embodiment where the extension 60F is solid, the extension 60F is not operable to receive the vessel mounting rod 14X extending into or through the extension 60F so the cap 58X may not include an opening 86X.

In an exemplary embodiment as shown in FIGS. 7A-7D, an extension 60G is primarily solid. In the exemplary embodiment where the extension 60G is primarily solid, the extension 60G has an interior 92G (at least at the connected end 88G of the extension 60G) and an exterior 94G. In the illustrated embodiment where the extension 60G is primarily solid, the extension 60G has a generally circular-shaped cross-section. However, one of ordinary skill in the art will appreciate that the extension 60G could have other shapes. For example, the extension 60G could have a generally square-shaped cross-section. In the exemplary embodiment where the extension 60G is primarily solid, the extension 60G is operable to receive the vessel mounting rod 14X extending into the interior 92G of the extension 60G.

As used herein, the connected end 68X of the core 50X, the connected end 72X of the filtering medium 52X, the connected end 78X of the housing 54X, the connected end 82X of the drip medium 56X, and the connected end 88X of the extension 60X is an end that is closest to the closed end 20X of the vessel 12X and furthest from the open end 22X of the vessel 12X. Similarly, the connected cap 58cX is a cap 58X that is closest to the closed end 20X of the vessel 12X and furthest from the open end 22X of the vessel 12X. As used herein, the free end 70X of the core 50X, the free end 74X of the filtering medium 52X, the free end 80X of the housing 54X, the free end 84X of the drip medium 56X, and the free end 90X of the extension 60X is an end that is furthest from the closed end 20X of the vessel 12X and closest to the open end 22X of the vessel 12X. Similarly, the free cap 58*f*X is a cap 58X that is furthest from the closed end 20X of the vessel 12X and closest to the open end 22X of the vessel 12X.

An exemplary embodiment of the mounting nut 18X is shown in detail in FIGS. 1A-1F, 2A-2F, 3A-3B, and 4A-4B. The mounting nut 18X is operable to thread onto the free end 48X of the vessel mounting rod 14X and to secure the filtering element 16X in the vessel 12X. In the illustrated embodiments, two (2) mounting nuts 18X are threaded onto the free end 48X of the vessel mounting rod 14X. Additionally, in the illustrated embodiments, a washer 96X is placed on the vessel mounting rod 14X between the free end 90X of the extension 60X and the mounting nuts 18X.

During assembly of the vessel 12 with a riser 40 and with a vessel mounting rod 14, the riser 40 is placed over the opening 38 in the partition 36 and secured to the partition 36. In an exemplary embodiment, the riser 40 is secured to the partition 36 by welding. Additionally, the vessel mounting rod 14 is secured to the riser 40. In an exemplary embodiment, the vessel mounting rod 14 is secured to the riser 40 by welding.

During assembly of the vessel 12 without a riser 40 and with a vessel mounting rod 14, the vessel mounting rod 14 is secured to the partition 36. In an exemplary embodiment, the vessel mounting rod 14 is secured to the partition 36 by welding.

During assembly of the vessel 12 with a riser 40 and without a vessel mounting rod 14, the riser 40 is placed over the opening 38 in the partition 36 and secured to the partition 36. In an exemplary embodiment, the riser 40 is secured to the partition 36 by welding.

During assembly of the vessel 12 without a riser 40 and without a vessel mounting rod 14, no additional steps are needed prior to installation of the filtering element 16.

During installation of the filtering element 16 with a riser 40, with a vessel mounting rod 14, and with a hollow extension 60, the filtering element 16 is inserted through the open end 22 of the vessel 12, placed over the vessel mounting rod 14, and secured to the riser 40 using the extension 60. More specifically, the free end 90 of the extension 60 is grasped and used to insert the filtering element 16 into the vessel 12. A sealing member 98 (such as a gasket or an O-ring) is placed between the filtering element 16 and the riser 40. The mounting nuts 18 are threaded onto the vessel mounting rod 14 to secure the filtering element 16 to the riser 40. As installed, the vessel mounting rod 14 extends through the riser 40, the opening 86 in the connected cap 58*c*, the interior 62 of the core 50, the opening 86 in the free cap 58*f*, and the interior 92 of the extension 60.

During installation of the filtering element 16 with a riser 40, with a vessel mounting rod 14, and with a primarily solid extension 60, the filtering element 16 is inserted through the open end 22 of the vessel 12, placed over the vessel mounting rod 14, and secured to the riser 40 using the extension 60. More specifically, the free end 90 of the extension 60 is grasped and used to insert the filtering element 16 into the vessel 12. The sealing member 98 (such as a gasket or an O-ring) is placed between the filtering element 16 and the riser 40. The connected end 88 of the extension 60 is secured to the free end 48 of the vessel mounting rod 14 using any known method to secure the filtering element 16 to the riser 40. For example, the connected end 88 of the extension 60 and the free end 48 of the vessel mounting rod 14 could have mating threads or an interference fit. As installed, the vessel mounting rod 14 extends through the riser 40, the opening 86 in the connected cap 58*c*, the interior 62 of the core 50, the opening 86 in the free cap 58*f*, and into the interior 92 of the connected end 88 of the extension 60.

During installation of the filtering element 16 without a riser 40, with a vessel mounting rod 14, and with a hollow extension 60, the filtering element 16 is inserted through the open end 22 of the vessel 12, placed over the vessel mounting rod 14, and secured to the partition 36 using the extension 60. More specifically, the free end 90 of the extension 60 is grasped and used to insert the filtering element 16 into the vessel 12. The sealing member 98 (such as a gasket or an O-ring) is placed between the filtering element 16 and the partition 36. The mounting nuts 18 are threaded onto the vessel mounting rod 14 to secure the filtering element 16 to the partition 36. As installed, the vessel mounting rod 14 extends through the opening 38 in the partition 36, the opening 86 in the connected cap 58*c*, the interior 62 of the core 50, the opening 86 in the free cap 58*f*, and the interior 92 of the extension 60.

During installation of the filtering element 16 without a riser 40, with a vessel mounting rod 14, and with a primarily solid extension 60, the filtering element 16 is inserted through the open end 22 of the vessel 12, placed over the vessel mounting rod 14, and secured to the partition 36 using the extension 60. More specifically, the free end 90 of the extension 60 is grasped and used to insert the filtering element 16 into the vessel 12. The sealing member 98 (such as a gasket or an O-ring) is placed between the filtering element 16 and the partition 36. The connected end 88 of the extension 60 is secured to the free end 48 of the vessel mounting rod 14 using any known method to secure the filtering element 16 to the partition 36. For example, the connected end 88 of the extension 60 and the free end 48 of the vessel mounting rod 14 could have mating threads or an interference fit. As installed, the vessel mounting rod 14 extends through the opening 38 in the partition 36, the opening 86 in the connected cap 58*c*, the interior 62 of the core 50, the opening 86 in the free cap 58*f*, and into the interior 92 of the connected end 88 of the extension 60.

During installation of the filtering element 16 with a riser 40 and without a vessel mounting rod 14, the filtering element 16 is inserted through the open end 22 of the vessel 12X, placed over the filter end 44 of the riser 40, and secured to the riser 40 using the extension 60. More specifically, the free end 90 of the extension 60 is grasped and used to insert the filtering element 16 into the vessel 12. The sealing member 98 (such as a gasket or an O-ring) is placed between the filtering element 16 and the riser 40. One of ordinary skill in the art will appreciate that the filtering element 16 can be secured to the riser 40 using any known method. For example, the filtering element 16 and the riser 40 could having mating threads or an interference fit. Since there is no vessel mounting rod 14, the extension 60 can be hollow, solid, or partially solid.

During installation of the filtering element 16 without a riser 40 and without a vessel mounting rod 14, the filtering element 16 is inserted through the open end 22 of the vessel 12, placed over the opening 38 in the partition 36, and secured to the partition 36 using the extension 60. More specifically, the free end 90 of the extension 60 is grasped and used to insert the filtering element 16 into the vessel 12. The sealing member 98 (such as a gasket or an O-ring) is placed between the filtering element 16 and the partition 36. One of ordinary skill in the art will appreciate that the filtering element 16 can be secured to the partition 36 using any known method. For example, the filtering element 16 and the partition 36 could having mating threads or an interference fit. Since there is no vessel mounting rod 14, the extension 60 can be hollow, solid, or partially solid While a variety of exemplary embodiments for installation of the filtering element 16 have been described and shown, one of ordinary skill in the art will appreciate that other embodiments could be used so long as the connected end 88 of the extension 60 is connected to the free cap 58f, the free end 90 of the extension 60 is not connected to any portion of the vessel 12, and the filtering element 16 is inserted into and secured in the vessel 12 using the extension 60.

After installation, in an exemplary embodiment of a filtering system 10 for removing primarily aerosols, the free end 74 of the filtering medium 52 is at or below the outlet 28 of the vessel 12, and the free end 90 of the extension 60 is at or above the outlet 28 of the vessel 12. After installation, in an exemplary embodiment of a filtering system 10 for removing primarily particulates, the connected end 72 of the filtering medium 52 is at or above the inlet 26 of the vessel 12, and the free end 90 of the extension 60 is at or above the inlet 26 of the vessel 12. Having the free end 74 of the filtering medium 52 at or below the outlet 28 of the vessel 12 in a filtering system 10 for removing primarily aerosols, and having the connected end 72 of the filtering medium 52 at or above the inlet 26 of the vessel 12 in a filtering system 10 for removing primarily particulates, improves performance of the filtering element 16. Having the free end 90 of the extension 60 at or above the outlet 28 of the vessel 12 in a filtering system 10 for removing primarily aerosols, and having the free end 90 of the extension 60 at or above the inlet 26 of the vessel 12 in a filtering system 10 for removing primarily particulates, improves access to the filtering element 16 during maintenance or replacement, as will be described in greater detail below.

During use, in an exemplary embodiment of a filtering system 10 for removing primarily aerosols, the pressurized gas enters the vessel 12 through the inlet 26, passes through the inlet chamber 32, the opening 38 in the partition 36, the riser 40 (if the vessel 12 includes a riser 40), and the filtering element 16, and exits the vessel 12 through the outlet 28. During use, in an exemplary embodiment of a filtering system 10 for removing primarily particulates, the pressurized gas enters the vessel 12 through the inlet 26, passes through the filtering element 16, the riser 40 (if the vessel 12 includes a riser 40), the opening 38 in the partition 36, and the outlet chamber 34, and exits the vessel 12 through the outlet 28.

During maintenance or replacement of the filtering element 16 with a vessel mounting rod 14, the mounting nuts 18 are threaded off the vessel mounting rod 14. The filtering element 16 is removed through the open end 22 of the vessel 12 using the extension 60. More specifically, the free end 90 of the extension 60 is grasped and used to remove the filtering element 16 from the vessel 12.

During maintenance or replacement of the filtering element 16 without a vessel mounting rod 14, the filtering element 16 is unsecured from the vessel 12 and removed through the open end 22 of the vessel 12 using the extension 60. More specifically, the free end 90 of the extension 60 is grasped and used to unsecure the filtering element 16 from the vessel 12 (e.g., the partition 36 or the riser 40) and remove the filtering element 16 from the vessel 12.

In an exemplary embodiment of a filtering system 10 for removing primarily aerosols, the filtering element 16 includes the connected cap 58c, the core 50, the filtering medium 52, the housing 54, the drip medium 56, the free cap 58f, and the extension 60. In an exemplary embodiment of a filtering system 10 for removing primarily particulates, the filtering element 16 includes the connected cap 58c, the core 50, the filtering medium 52, the free cap 58f, and the extension 60. Since the free end 90 of the extension 60 is at or above the outlet 28 of the vessel 12 in a filtering system 10 for removing primarily aerosols and at or above the inlet 26 of the vessel 12 in a filtering system 10 for removing primarily particulates, the person maintaining or replacing the filtering element 16 can reach the free end 90 of the extension 60 from the open end 22 of the vessel 12. As a result, the person maintaining or replacing the filtering element 16 does not need to enter the vessel 12 in order to maintain or replace the filtering element 16.

One of ordinary skill in the art will now appreciate that the present invention provides a filtering system including an impermeable extension for a filtering element. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A filtering element for use in a vessel, the vessel including a closed end and an open end, comprising:
   a core, the core being operable to extend in a vessel, the core being hollow, the core having an interior and an exterior, the core being rigid, the core including a connected end and a free end, the core having a length and a width;
   a filtering medium, the filtering medium being operable to extend around the core, the filtering medium being permeable, the filtering medium including a connected end and a free end, the filtering medium having a length and a width;
   a cap, the cap being operable to connect to the free end of the core and the free end of the filtering medium; and
   an extension, the extension being rigid, the extension being impermeable, the extension including a connected end and a free end, the connected end of the extension being operable to connect to the cap, when the connected end of the extension is connected to the cap, the free end of the extension extends away from the cap, the core, and the filtering medium, toward the open end of the vessel, and does not extend through any of the cap, the core, and the filtering medium, the extension having a length and a width, the length of the extension being greater than the width of the extension, the extension being not operable to connect to any portion of the vessel;
   wherein, during installation, the filtering element is operable to be inserted into and secured in the vessel using the extension;
   wherein, during use, the pressurized gas enters the vessel through an inlet, passes through the filtering element, and exits the vessel through an outlet; and
   wherein, during maintenance or replacement, the filtering element is operable to be removed from the vessel using the extension.

2. The filtering element of claim 1, wherein the filtering medium is operable to remove primarily aerosols from the pressurized gas.

3. The filtering element of claim 1, wherein the filtering medium is operable to remove primarily particulates from the pressurized gas.

4. The filtering element of claim 1, wherein the extension is hollow.

5. The filtering element of claim 1, wherein the extension is one of solid and primarily solid.

6. The filtering element of claim 1, wherein the width of the extension is less than the width of the filtering medium.

7. The filtering element of claim 1, wherein the extension has a generally constant width.

8. The filtering element of claim 1, wherein the extension is separately formed from the cap.

9. The filtering element of claim 1, wherein the extension is integrally formed with the cap.

10. A filtering system, comprising:
a vessel, the vessel being operable to hold a pressurized gas, the vessel being hollow, the vessel being rigid, the vessel including a closed end and an open end, the vessel including a cover operable to close the open end, the vessel including an inlet, an outlet, and a drain; and
a filtering element, the filtering element being operable to extend in the vessel, the filtering element including:
a core, the core being operable to extend in the vessel, the core being hollow, the core having an interior and an exterior, the core being rigid, the core including a connected end and a free end, the core having a length and a width;
a filtering medium, the filtering medium being operable to extend around the core, the filtering medium being permeable, the filtering medium including a connected end and a free end, the filtering medium having a length and a width;
a cap, the cap being operable to connect to the free end of the core and the free end of the filtering medium; and
an extension, the extension being rigid, the extension being impermeable, the extension including a connected end and a free end, the connected end of the extension being operable to connect to the cap, when the connected end of the extension is connected to the cap, the free end of the extension extends away from the cap, the core, and the filtering medium, toward the open end of the vessel, and does not extend through any of the cap, the core, and the filtering medium, the extension having a length and a width, the length of the extension being greater than the width of the extension, the extension being not operable to connect to any portion of the vessel; and
wherein, during installation, the filtering element is operable to be inserted into and secured in the vessel using the extension;
wherein, during use, the pressurized gas enters the vessel through an inlet, passes through the filtering element, and exits the vessel through an outlet; and
wherein, during maintenance or replacement, the filtering element is operable to be removed from the vessel using the extension.

11. The filtering system of claim 10, wherein the filtering system is for removing primarily aerosols and the free end of the filtering medium is at or below the outlet of the vessel.

12. The filtering system of claim 10, wherein the filtering system is for removing primarily aerosols and the extension is at or above the outlet of the vessel.

13. The filtering system of claim 10, wherein the filtering system is for removing primarily particulates and the connected end of the filtering medium is at or above the inlet of the vessel.

14. The filtering system of claim 10, wherein the filtering system is for removing primarily particulates and the free end of the extension is at or above the inlet of the vessel.

15. A filtering system, comprising:
a vessel, the vessel being operable to hold a pressurized gas, the vessel being hollow, the vessel being rigid, the vessel including a closed end and an open end, the vessel including a cover operable to close the open end, the vessel including an inlet, an outlet, and a drain, the vessel including a riser, the riser being operable to extend in the vessel and to fluidly connect to the inlet, the riser being hollow, the riser being rigid, the riser including a vessel end and a filter end; and
a filtering element, the filtering element being operable to extend in the vessel, the filtering element including:
a core, the core being operable to extend in the vessel, the core being hollow, the core having an interior and an exterior, the core being rigid, the core including a connected end and a free end, the core having a length and a width;
a filtering medium, the filtering medium being operable to extend around the core, the filtering medium being permeable, the filtering medium including a connected end and a free end, the filtering medium having a length and a width;
a cap, the cap being operable to connect to the free end of the core and the free end of the filtering medium; and
an extension, the extension being rigid, the extension being impermeable, the extension including a connected end and a free end, the connected end of the extension being operable to connect to the cap, when the connected end of the extension is connected to the cap, the free end of the extension extends away from the cap, the core, and the filtering medium, toward the open end of the vessel, and does not extend through any of the cap, the core, and the filtering medium, the extension having a length and a width, the length of the extension being greater than the width of the extension, the extension being not operable to connect to any portion of the vessel; and
wherein, during installation, the filtering element is operable to be inserted into and secured in the vessel using the extension;
wherein, during use, the pressurized gas enters the vessel through an inlet, passes through the filtering element, and exits the vessel through an outlet; and
wherein, during maintenance or replacement, the filtering element is operable to be removed from the vessel using the extension.

16. The filtering system of claim 15, wherein the filtering system is for removing primarily aerosols and the free end of the filtering medium is at or below the outlet of the vessel.

17. The filtering system of claim 15, wherein the filtering system is for removing primarily aerosols and the free end of the extension is at or above the outlet of the vessel.

18. The filtering system of claim 15, wherein the filtering system is for removing primarily particulates and the connected end of the filtering medium is at or above the inlet of the vessel.

19. The filtering system of claim 15, wherein the filtering system is for removing primarily particulates and the free end of the extension is at or above the inlet of the vessel.

* * * * *